US006978038B2

(12) United States Patent  (10) Patent No.: US 6,978,038 B2
Hepworth et al.  (45) Date of Patent: Dec. 20, 2005

(54) SYSTEMS AND METHODS FOR PIXEL GAIN COMPENSATION IN MACHINE-READABLE GRAPHICAL CODES

(75) Inventors: Paul J. Hepworth, Riverton, UT (US); Weiyang Zhou, Sandy, UT (US)

(73) Assignee: The Code Corporation, Draper, UT (US)

( * ) Notice: Subject to any disclaimer, the term of this patent is extended or adjusted under 35 U.S.C. 154(b) by 608 days.

(21) Appl. No.: 10/121,248

(22) Filed: Apr. 12, 2002

(65) Prior Publication Data

US 2002/0150309 A1    Oct. 17, 2002

Related U.S. Application Data

(60) Provisional application No. 60/283,577, filed on Apr. 13, 2001.

(51) Int. Cl.[7] ............................. G06K 9/00; G06K 7/10
(52) U.S. Cl. ................... 382/112; 382/299; 235/462.01
(58) Field of Search ........................ 382/112, 162, 266, 382/274, 282, 299; 235/462.01, 462.02, 462.05, 235/462.16

(56) References Cited

U.S. PATENT DOCUMENTS

| | | | |
|---|---|---|---|
| 3,513,320 A | 5/1970 | Weldon | 250/219 |
| 4,488,679 A | 12/1984 | Bockholt et al. | 235/469 |
| 4,654,718 A | 3/1987 | Sueyoshi | 358/257 |
| 4,752,675 A | 6/1988 | Zetmeir | 235/375 |
| 4,896,029 A | 1/1990 | Chandler et al. | 235/494 |
| 4,958,064 A | 9/1990 | Kirkpatrick | 235/384 |
| 4,998,010 A | 3/1991 | Chandler et al. | 235/494 |
| 5,047,614 A | 9/1991 | Bianco | 235/385 |
| 5,113,445 A | 5/1992 | Wang | |
| 5,153,418 A | 10/1992 | Batterman et al. | 235/494 |
| 5,159,635 A | 10/1992 | Wang | |
| 5,189,292 A | 2/1993 | Batterman et al. | 235/494 |
| 5,223,701 A | 6/1993 | Batterman et al. | 235/494 |
| 5,343,028 A | 8/1994 | Figarella et al. | 235/462 |
| 5,352,878 A | 10/1994 | Smith et al. | 235/462 |
| 5,412,196 A | 5/1995 | Surka | 235/462 |
| 5,428,211 A | 6/1995 | Zheng et al. | 235/462 |
| 5,438,188 A | 8/1995 | Surka | 235/462 |
| 5,465,291 A | 11/1995 | Barrus et al. | 379/67 |

(Continued)

FOREIGN PATENT DOCUMENTS

EP    0837406 A2    4/1998    ........... G06F 17/30

(Continued)

OTHER PUBLICATIONS

"Punched Cards to Bar Codes," Benjamin Nelson, Helmers Publishing, Inc. 1997, pp. 1-16.

(Continued)

*Primary Examiner*—Kanjibhai Patel
(74) *Attorney, Agent, or Firm*—Madson & Metcalf

(57) ABSTRACT

A method for increasing the readability of a machine-readable graphical code on a printing surface is provided. The method includes receiving a graphical code image. The graphical code image is an electronic representation of a graphical code. The graphical code image includes a white region and a non-white region adjacent to the white region. The method also includes determining a size increase of the non-white region. The size increase indicates how much the size of the non-white region will increase when the graphical code image is printed on the printing surface. The method also includes creating a size compensated graphical code image by reducing the size of the non-white region by an amount that will substantially compensate for the size increase of the non-white region.

18 Claims, 18 Drawing Sheets

U.S. PATENT DOCUMENTS

| | | | | |
|---|---|---|---|---|
| 5,478,999 | A | 12/1995 | Figarella et al. | 235/462 |
| 5,483,052 | A | 1/1996 | Smith, III et al. | 235/472 |
| 5,493,105 | A | 2/1996 | Desai | 235/375 |
| 5,545,887 | A | 8/1996 | Smith et al. | 235/462 |
| 5,604,640 | A | 2/1997 | Zipf et al. | 359/803 |
| 5,612,527 | A | 3/1997 | Ovadia | 235/383 |
| 5,804,803 | A | 9/1998 | Cragun et al. | 235/375 |
| 5,835,615 | A * | 11/1998 | Lubow et al. | 382/112 |
| 5,850,080 | A * | 12/1998 | Herzig | 235/494 |
| 5,853,252 | A * | 12/1998 | Wright et al. | 400/103 |
| 5,869,819 | A | 2/1999 | Knowles et al. | 235/375 |
| 5,903,729 | A | 5/1999 | Reber et al. | 395/200.49 |
| 5,905,248 | A | 5/1999 | Russell et al. | 235/462 |
| 5,905,251 | A | 5/1999 | Knowles | 235/472.01 |
| 5,933,634 | A | 8/1999 | Enokido et al. | |
| 5,933,829 | A | 8/1999 | Durst et al. | 707/10 |
| 5,938,726 | A | 8/1999 | Reber et al. | 709/217 |
| 5,978,773 | A | 11/1999 | Hudetz et al. | 705/23 |
| 5,984,193 | A * | 11/1999 | Uhling | 235/494 |
| 5,992,752 | A | 11/1999 | Wilz, Sr. et al. | 235/472.01 |
| 6,012,102 | A | 1/2000 | Shachar | 710/5 |
| 6,027,024 | A | 2/2000 | Knowles | 235/472.01 |
| 6,032,195 | A | 2/2000 | Reber et al. | 709/245 |
| 6,068,188 | A | 5/2000 | Knowles | 235/462.01 |
| 6,076,733 | A | 6/2000 | Wilz, Sr. et al. | 235/462.01 |
| 6,098,106 | A | 8/2000 | Philyaw et al. | |
| 6,108,656 | A | 8/2000 | Durst et al. | 707/10 |
| 6,138,151 | A | 10/2000 | Reber et al. | 709/219 |
| 6,154,738 | A | 11/2000 | Call | 707/4 |
| 6,247,646 | B1 * | 6/2001 | Iwaguchi et al. | 235/462.04 |
| 6,377,986 | B1 | 4/2002 | Philyaw | |
| 6,384,744 | B1 | 5/2002 | Philyaw | |
| 6,535,883 | B1 | 3/2003 | Lee et al. | |
| 6,564,249 | B2 | 5/2003 | Shiigi | |
| 6,584,601 | B1 | 6/2003 | Kodosky et al. | |
| 6,601,772 | B1 * | 8/2003 | Rubin et al. | 235/494 |
| 6,834,803 | B2 * | 12/2004 | Schuessler | 235/462.01 |
| 2002/0147743 | A1 | 10/2002 | Le et al. | |

FOREIGN PATENT DOCUMENTS

| | | | |
|---|---|---|---|
| WO | WO98/03923 | 1/1998 | G06F 15/163 |
| WO | WO98/06055 | 2/1998 | G06F 163/00 |
| WO | WO98/24036 | 6/1998 | G06F 17/00 |
| WO | WO98/40823 | 9/1998 | G06F 13/00 |
| WO | WO98/49813 | 11/1998 | H04L 29/06 |
| WO | WO99/04326 | 1/1999 | |

OTHER PUBLICATIONS

"MiniCode," http://www.omniplanar.com/minicode.html, pp. 1-10, May 17, 1999.

* cited by examiner

SYSTEMS AND METHODS FOR PIXEL GAIN COMPENSATION IN MACHINE-READABLE GRAPHICAL CODES

RELATED APPLICATIONS

This application is related to and claims priority from U.S. Patent Application Ser. No. 60/283,577, filed Apr. 13, 2001, for "Method and System for Dot Gain Correction of Graphical Code on Printing Surface," with inventors Paul Hepworth and Weiyang Zhou, which is incorporated herein by reference.

BACKGROUND OF THE INVENTION

1. Field of the Invention

The present invention relates generally to the field of graphical-code reading computer systems. More specifically, the present invention relates to systems and methods for pixel gain compensation in machine-readable graphical codes.

2. Description of Related Background Art

Computer technology has entered many areas to simplify manual tasks and to make information more readily available. Most people use several computer programs every day that greatly simplify their work day. In addition, through the use of a computer, vast amounts of information are readily available. Computer software and electronic information sources are typically found on storage media or storage devices such as hard drives, CD-ROMs, DVD-ROMs, etc., on a local computer, on a local computer network or a global computer network, such as the Internet.

Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are a number of programs available to help users with various needs that they may have. Typically, computer programs operate upon source data in order to help a user. Thus, the source data needs to be input into the computer program.

One way to input source data into a computer program involves the use of machine-readable graphical codes, such as bar codes, matrix codes, etc. Graphical codes may be inserted into printable documents or printed on labels that can be affixed to objects. The use of these graphical codes may greatly simplify the actions required of a user to access relevant information.

Graphical codes are typically printed by a printing device on a printing surface, such as paper. The smallest unit within a graphical code is a pixel. Each pixel within the graphical code may increase in size when printed. This occurrence is referred to herein as pixel gain. Pixel gain may be due to the fact that some printing surfaces readily absorb the ink used by the printing device. This is often referred to as ink bleeding. Many factors affect pixel gain, including the printing device, the type of ink used, the type of printing surface used, etc.

Unfortunately, pixel gain may cause graphical codes to become unreadable. For example, a graphical code typically includes a white region adjacent to a non-white region. The width of the non-white region, and/or the distance between a first non-white region and a second non-white region, may contain information that may be converted into useable data by a graphical code reading device. If the sizes of the white and non-white regions become distorted because of pixel gain, it may become difficult for the graphical code reading device to accurately read the graphical code. Accordingly, benefits may be realized if means were provided to reduce the effects of pixel gain in machine-readable graphical codes.

BRIEF DESCRIPTION OF THE DRAWINGS

Non-exhaustive embodiments of the invention are described with reference to the figures, in which.

DETAILED DESCRIPTION

Figure 1:
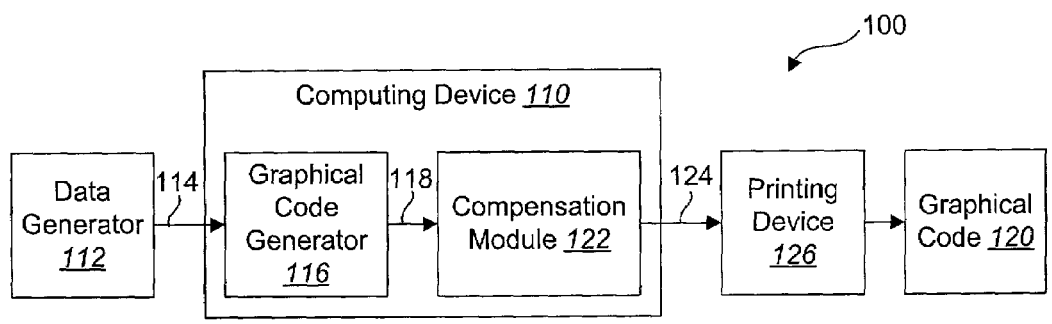
FIG. 1 is a block diagram of an embodiment of a system for increasing the readability of a machine-readable graphical code on a printing surface.

A method for increasing the readability of a machine-readable graphical code on a printing surface is provided. The method includes receiving a graphical code image. The graphical code image is an electronic representation of a graphical code. The graphical code image includes a white region and a non-white region adjacent to the white region. The method also includes determining a size increase of the non-white region. The size increase indicates how much the size of the non-white region will increase when the graphical code image is printed on the printing surface. The method also includes creating a size compensated graphical code image by reducing the size of the non-white region by an amount that will substantially compensate for the size increase of the non-white region. (Reducing the size of the non-white region increases the size of the white region.)

In one embodiment, reducing the size of the non-white region involves reducing the width of the non-white region. In another embodiment, reducing the size of the non-white region involves reducing the length of the non-white region. In another embodiment, reducing the size of the non-white region involves reducing the area of the non-white region.

The non-white region may include one or more pixels. In such an embodiment, reducing the size of the non-white region may involve eliminating one or more of the pixels in the non-white region. Reducing the size of the non-white region may also involve reducing the size of one or more of the pixels in the non-white region. Reducing the size of a pixel may involve changing the pixel from a first color to a second color. The difference between the darkness of the first color and the darkness of the second color may be proportional to the reduction in the size of the pixel.

A system for increasing the readability of a machine-readable graphical code on a printing surface is also provided. The system includes a computing device. The computing device includes a processor and memory in electronic communication with the processor. The computing device also includes a graphical code generator configured to convert source data into a graphical code image. The graphical code image is an electronic representation of a graphical code. The graphical code image includes a white region and a non-white region adjacent to the white region.

The computing device also includes a compensation module in electronic communication with the graphical code generator. The compensation module is configured to receive the graphical code image from the graphical code generator. The compensation module is also configured to determine a size increase of the non-white region. The size increase indicates how much the size of the non-white region will increase when the graphical code image is printed on the printing surface. The compensation module is also configured to create a size compensated graphical code image by reducing the size of the non-white region by an amount that will substantially compensate for the size increase of the non-white region.

The system also includes a printing device in electronic communication with the computing device. The printing device is configured to print the size compensated graphical code image on the printing surface.

A computer-readable medium for storing program data is also provided. The program data includes executable instructions for implementing a method for increasing the readability of a machine-readable graphical code on a printing surface, as previously described.

FIG. 1 is a block diagram of an embodiment of a system 100 for increasing the readability of a machine-readable graphical code on a printing surface. The system 100 includes a computing device 110. The computing device 110 may be a personal computer, workstation, hand-held computer, personal digital assistant, cell phone, game machine, microcontroller, server, mainframe, supercomputer, or any variation or related device thereof.

The system 100 also includes a data generator 112 in electronic communication with the computing device 110. The data generator 112 may be any type of device that is capable of providing source data 114 that may be utilized by the computing device 110. In FIG. 1, the data generator 112 is shown as being separate from the computing device 110. For example, the data generator 112 may be an input device (e.g., keyboard, mouse, microphone, etc.) that may be used to input the source data 114 into the computing device 110. Alternatively, the data generator 112 may be located within the computing device 110. For example, the data generator 112 may be a file containing the source data 114 that is stored within the computing device 110.

The computing device 110 also includes a graphical code generator 116. The graphical code generator 116 is configured to convert the source data 114 into a graphical code image 118. Ultimately, the graphical code image 118 will be printed on a printing surface (e.g., paper) as a graphical code 120. The graphical code 120 may be a bar code, matrix code, or any other type of code that may be read by a graphical code reading device (not shown). The graphical code image 118 is an electronic representation of the graphical code 120. Graphical code generators 116 are commercially available and known to those skilled in the art.

Typically, the graphical code image 118 includes one or more non-white regions. If the graphical code image 118 were printed on a printing surface, the size of the non-white regions within the graphical code image 118 may increase because of ink bleeding. This may cause inaccuracies when the graphical code 120 is read by the graphical code reading device. To reduce the effects of ink bleeding, the computing device 110 also includes a compensation module 122. The compensation module 122 receives the graphical code image 118 from the graphical code generator 116 and converts it 118 into a size compensated graphical code image 124. Specifically, the compensation module 122 alters the graphical code image 118 to reduce some or all of the size distortion that may occur during printing. For example, the compensation module 122 may reduce the length, width, area, and/or other desired size of the dark regions within the graphical code image 118 to compensate for the effects of ink bleeding.

The size compensated graphical code image 124 is then sent to a printing device 126. The printing device 126 prints the size compensated graphical code image 124 on a printing surface, such as paper. Printing devices 126 are commercially available and known to those skilled in the art.

Figure 2:
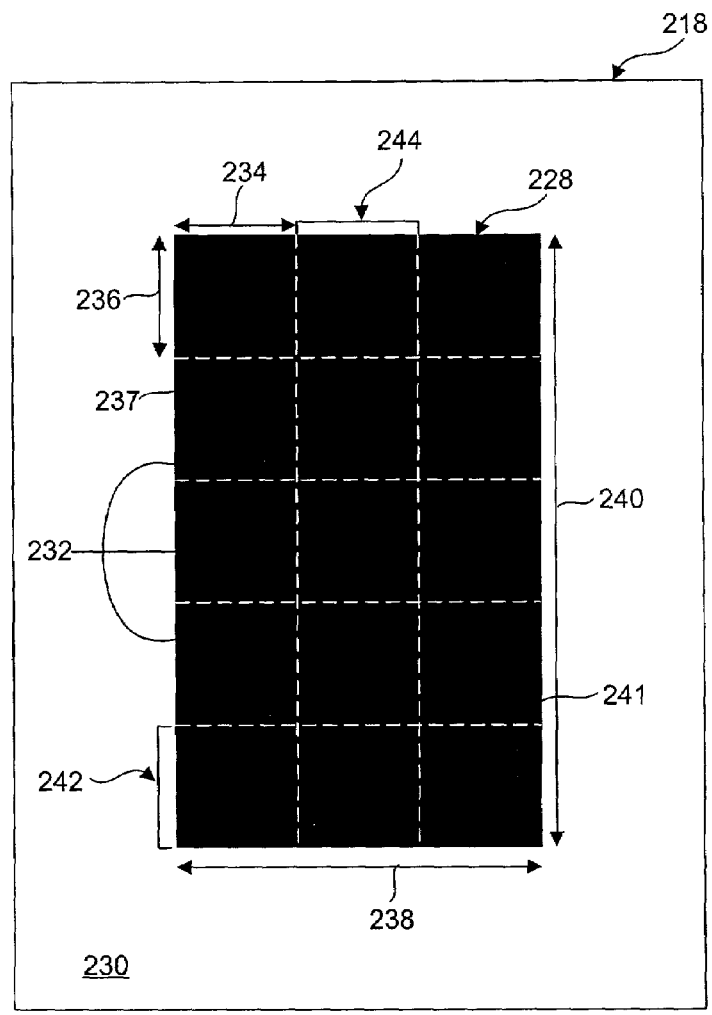
FIG. 2 is an illustration of an embodiment of a graphical code image.

FIG. 2 is an illustration of an embodiment of a graphical code image 218. The graphical code image 218 includes a non-white region 228 surrounded by a white region 230. The non-white region 228 includes a plurality of pixels 232. For purposes of illustration, the boundaries of the pixels 232 are illustrated by dotted lines.

Each pixel 232 has a width 234 of one width unit, a length 236 of one length unit, and an area 237 of one area unit. There are fifteen pixels 232 in the non-white region 228 illustrated in FIG. 2. The non-white region 228 has a width 238 of three width units, a length 240 of five length units, and an area 241 of fifteen area units.

The pixels 232 in the non-white region 228 are organized into rows 242 and columns 244. The non-white region 228 includes five rows 242 and three columns 244. The pixels 232 in the first and fifth rows 242 and the first and third columns 244 border the white region 230.

Because of ink bleeding, each pixel 232 within the non-white region 228 will increase in size when printed. The "pixel gain" is a measure of how much each pixel 232 within the non-white region 228 will increase in size when printed. Typically, the size of a pixel 232 increases uniformly during printing. Thus, if a pixel 232 experiences a pixel gain of one, this means that the width 234 of the pixel 232 increases by one width unit and the length 236 of the pixel 232 increases by one length unit when printed. Many factors affect pixel gain, including the printing device 126, the type of ink used, the type of printing surface used, etc. Because many of these factors are known in advance of printing, it may be possible to calculate pixel gain before printing occurs.

Knowing the pixel gain makes it possible to determine how much the non-white region 228 will increase in size during printing. For example, if the non-white region 228 has a uniform width 238, the width 238 of the non-white region 228 will increase by pixel gain width units during printing. This is because half of the increase in width 234 experienced by the pixels 232 in the first and third columns 244 will spill over into the white region 230, causing the width 238 of the non-white region 228 to increase by pixel gain width units. Similarly, if the non-white region 228 has a uniform length, the length 240 of the non-white region 228 will increase by pixel gain length units during printing. This is because half of the increase in length 236 experienced by the pixels 232 in the first and fifth rows 242 will spill over into the white region 230, causing the length 240 of the non-white region 228 to increase by pixel gain length units. Knowing how much the width 238 and the length 240 of the non-white region 228 will increase also makes it possible to calculate how much the area 241 of the non-white region 228 will increase during printing.

Of course, in alternative embodiments, the width 238 and the length 240 of the non-white region 228 may be non-uniform. In fact, the non-white region 228 may be any shape that may be read and understood by a graphical code reading device. Those skilled in the art will recognize many different ways to use the pixel gain to determine how much the non-white region 228 will increase in size during printing.

Figure 3:
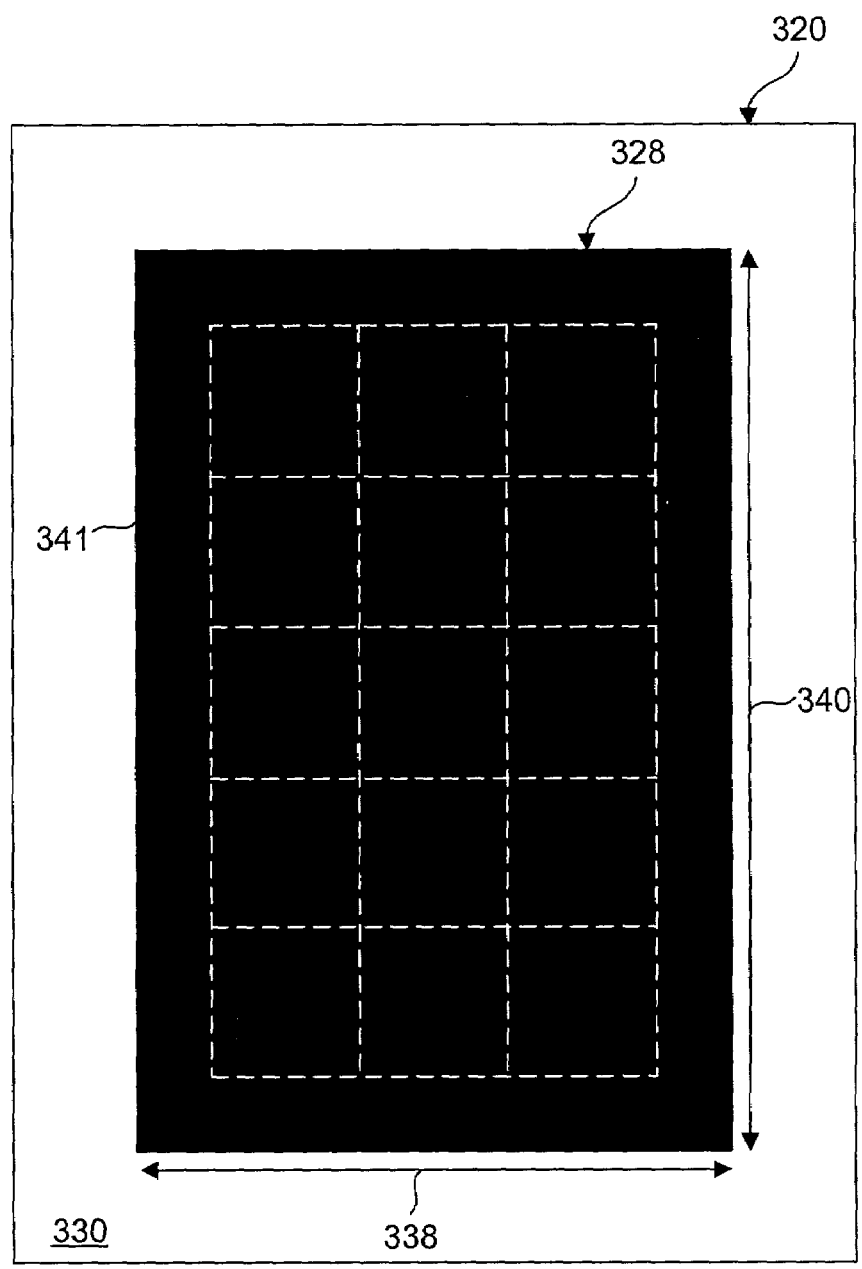
FIG. 3 is an illustration of an embodiment of a printed graphical code.

FIG. 3 is an illustration of an embodiment of a printed graphical code 320. The printed graphical code 320 shown in FIG. 3 corresponds to the graphical code image 218 shown in FIG. 2. That is, FIG. 3 illustrates how the graphical code image 218 in FIG. 2 would appear if it 218 were printed on a printing surface. For purposes of illustration, the dotted lines that illustrate the boundaries of the pixels 232 in the graphical code image 218 of FIG. 2 are superimposed on the printed graphical code 320.

The printed graphical code 320 is shown with a pixel gain of one. As stated previously, this means that the width 234 of each pixel 232 within the non-white region 228 increases by one width unit during printing, and the length 236 of each pixel 232 within the non-white region 228 increases by one length unit during printing. Consequently, the non-white region 328 in the printed graphical code 320 is larger in size than the non-white region 228 in the graphical code image 218.

As stated previously, the pixel gain may be used to determine how much the non-white region 228 in the graphical code image 218 will increase during printing. The non-white region 228 in the graphical code image 218 has a uniform width 238 and length 240. Thus, as stated previously, the width 238 of the non-white region 228 will increase by pixel gain width units during printing, and the length 240 of the non-white region 228 will increase by pixel gain length units during printing. Because the printed graphical code 320 is shown with a pixel gain of one, the width 338 of the non-white region 328 in the printed graphical code 320 is one width unit wider than the width 238 of the non-white region 228 in the graphical code image 218. Similarly, the length 340 of the non-white region 328 in the printed graphical code 320 is one length unit longer than the length 240 of the non-white region 228 in the graphical code image 218. Because the width 338 and the length 340 of the non-white region 328 in the printed graphical code 320 have increased, the area 341 of the non-white region 328 in the printed graphical code is larger than the area 241 of the non-white region 228 in the graphical code image 218.

To compensate for the size distortion that occurs during printing, different types of size compensation may be performed on the graphical code image 218. The different types of size compensation may include width compensation, length compensation, area compensation, and so forth. Width compensation may involve reducing the width 238 of the non-white region 228 in the graphical code image 218 by an amount that will compensate for the increase in width 238 that occurs during printing. Length compensation may involve reducing the length 240 of the non-white region 228 in the graphical code image 218 by an amount that will compensate for the increase in length 240 that occurs during printing. Area compensation may involve reducing the area of the non-white region 228 in the graphical code image 218 by an amount that will compensate for the increase in area that occurs during printing. Those skilled in the art will recognize additional types of size compensation in light of the teachings contained herein.

Figure 4:
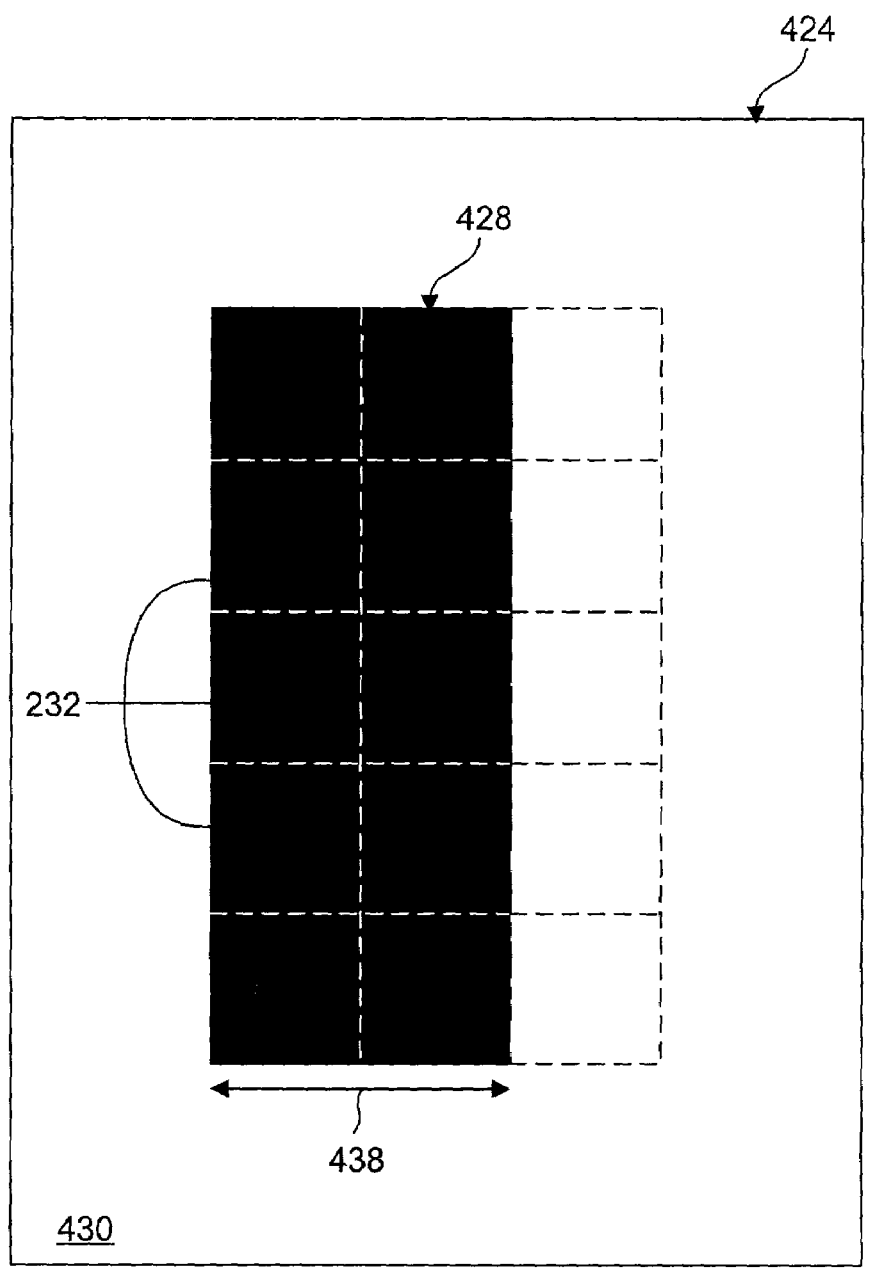
FIG. 4 is an illustration of an embodiment of a size compensated graphical code image.

FIG. 4 is an illustration of an embodiment of a size compensated graphical code image 424. The size compensated graphical code image 424 shown in FIG. 4 corresponds to the graphical code image 218 shown in FIG. 2. That is, size compensation has been performed on the graphical code image 218 shown in FIG. 2 in order to produce the size compensated graphical code image 424 shown in FIG. 4. Once again, for purposes of illustration, the dotted lines that illustrate the boundaries of the pixels 232 in the graphical code image 218 in FIG. 2 are superimposed on the size compensated graphical code image 424 in FIG. 4.

In the embodiment shown in FIG. 4, width compensation has been performed assuming a pixel gain of one. As stated previously, width compensation may involve reducing the width 238 of the non-white region 228 in the graphical code image 218 by an amount that will compensate for the increase in width 238 that occurs during printing. Because the non-white region 228 in the graphical code image 218 has a uniform width 238, and because the pixel gain is one, the non-white region 228 will increase by one width unit during printing. Thus, width compensation may involve reducing the width 238 of the graphical code image 218 by one width unit.

The width 238 of the graphical code image 218 may be reduced in several ways. In the embodiment shown in FIG. 4, a column 244 of pixels 232 from the non-white region 228 in the graphical code image 218 has been eliminated. The width 238 of the non-white region 228 in the graphical code image 218 is three width units. Consequently, the width 438 of the non-white region 428 in the size compensated graphical code image 424 is two width units.

In an alternative embodiment, multiple columns 244 of pixels 232 may be reduced in width 234. For example, to reduce the width 238 of the non-white region 228 by one width unit, two columns 244 of pixels 232 may be reduced in width 234 by 0.5 width units each. This may be accomplished by changing the color of the pixels 232 in the two columns 244 from black to 50% black (i.e., a shade of gray that is 50% as dark as black). Alternatively, a first column 244 may be reduced in width 234 by 75%, and a second column 244 may be reduced in width 234 by 25%. This may be accomplished by changing the color of the pixels 232 in the first column 244 from black to 25% black, and by changing the color of the pixels 232 in the second column 244 from black to 75% black. Those skilled in the art will recognize additional ways to reduce the width 238 of the non-white region 228 in light of the teachings contained herein.

Figure 5:
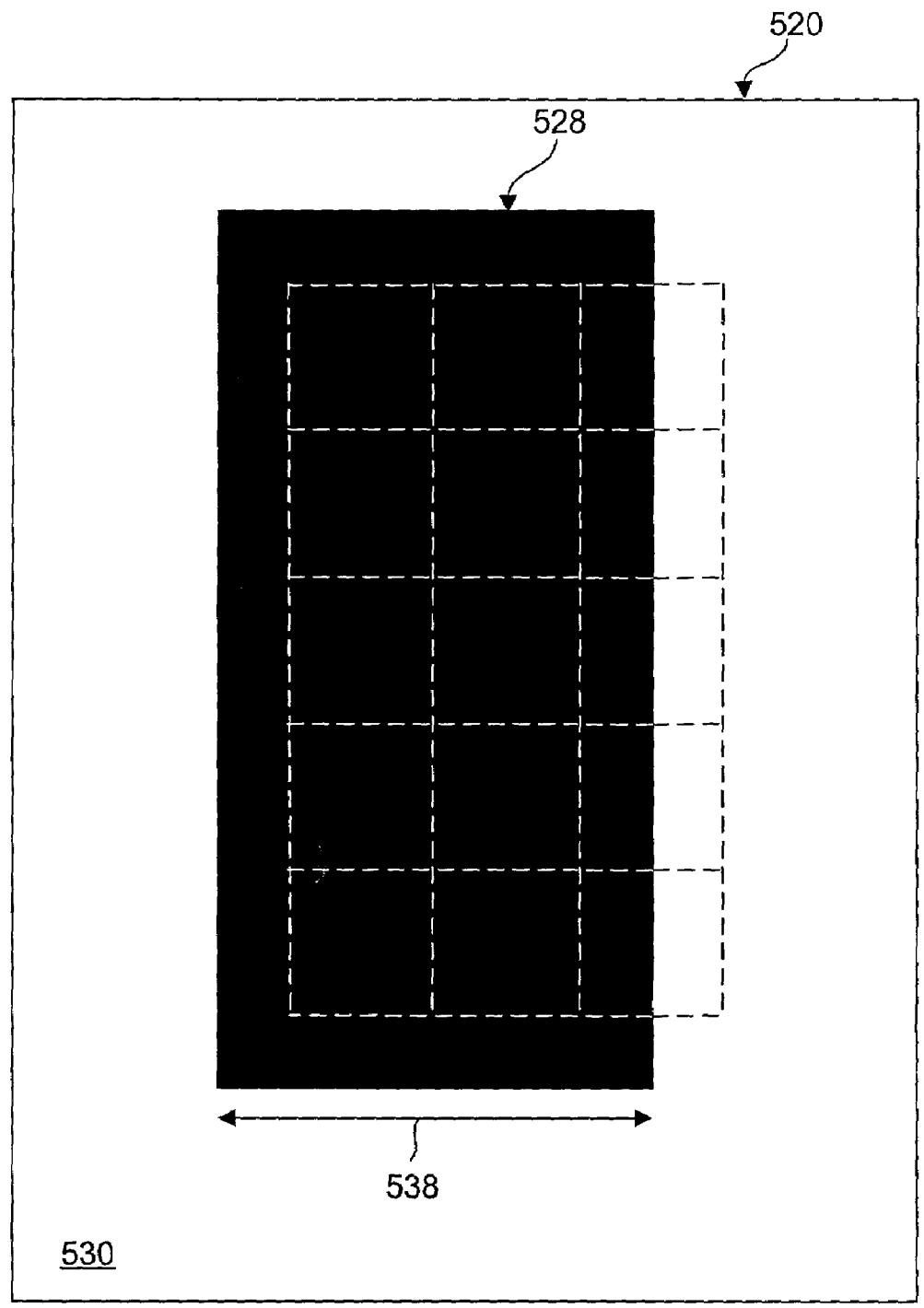
FIG. 5 is an illustration of an alternative embodiment of a printed graphical code.

FIG. 5 is an illustration of an alternative embodiment of a printed graphical code 520. The printed graphical code 520 shown in FIG. 5 corresponds to the size compensated graphical code image 424 shown in FIG. 4. That is, FIG. 5 illustrates how the size compensated graphical code image 424 in FIG. 4 would appear if it 424 were printed on a printing surface. Once again, for purposes of illustration, the dotted lines that illustrate the boundaries of the pixels 232 in the graphical code image 218 in FIG. 2 are superimposed on the printed graphical code 520.

Each pixel 232 in the size compensated graphical code 424 experiences a pixel gain of one during printing. The width 438 of the non-white region 428 in the size compensated graphical code image 424 is two width units. Thus, the width 538 of the non-white region 528 in the printed graphical code 520 is three width units. This matches the width 238 of the graphical code image 218 shown in FIG. 2. Thus, width compensation has eliminated the width distortion in the printed graphical code 520 due to ink bleeding.

Figure 6:
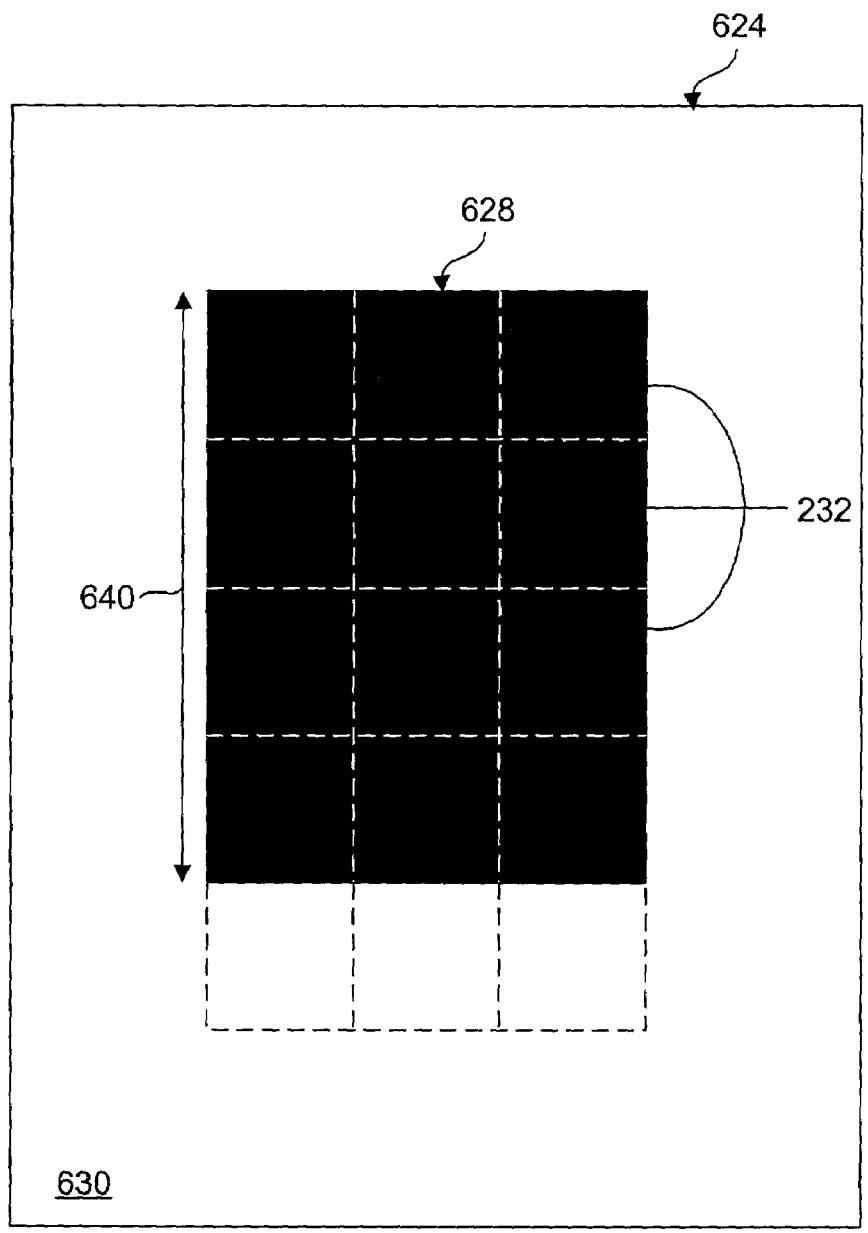
FIG. 6 is an illustration of an alternative embodiment of a size compensated graphical code image.

FIG. 6 is an illustration of an alternative embodiment of a size compensated graphical code image 624. The size compensated graphical code image 624 shown in FIG. 6 corresponds to the graphical code image 218 shown in FIG. 2. That is, size compensation has been performed on the graphical code image 218 shown in FIG. 2 in order to produce the size compensated graphical code image 624 shown in FIG. 6. Once again, for purposes of illustration, the dotted lines that illustrate the boundaries of the pixels 232 in the graphical code image 218 in FIG. 2 are superimposed on the size compensated graphical code image 624 in FIG. 6.

In the embodiment shown in FIG. 6, length compensation has been performed assuming a pixel gain of one. As stated previously, length compensation may involve reducing the length 240 of the non-white region 228 in the graphical code image 218 by an amount that will compensate for the increase in length 240 that occurs during printing. Because the non-white region 228 in the graphical code image 218 has a uniform length 240, and because the pixel gain is one, the length 240 of the non-white region 228 will increase by one length unit during printing. Thus, length compensation may involve reducing the length 240 of the non-white region 228 in the graphical code image 218 by one length unit.

The length 240 of the non-white region 228 may be reduced in several ways. In the embodiment shown in FIG. 6, a row 242 of pixels 232 from the non-white region 228 in the graphical code image 218 has been eliminated. The length 240 of the non-white region 228 in the graphical code image 218 is five length units. Consequently, the length 640 of the non-white region 628 in the size compensated graphical code image 624 is four length units.

In an alternative embodiment, multiple rows 242 of pixels 232 may be reduced in length 236. For example, to reduce the length 240 of the non-white region 228 by one length unit, two rows 242 of pixels 232 may be reduced in length 236 by 0.5 length units each. This may be accomplished by changing the color of the pixels 232 in the two rows 242 from black to 50% black. Alternatively, a first row 242 may be reduced in length 236 by 0.75 length units, and a second row 242 may be reduced in length 236 by 0.25 length units. This may be accomplished by changing the color of the pixels 232 in the first row 242 from black to 25% black, and by changing the color of the pixels 232 in the second row 242 from black to 75% black. Those skilled in the art will recognize additional ways to reduce the length 240 of the non-white region 228 in light of the teachings contained herein.

Figure 7:
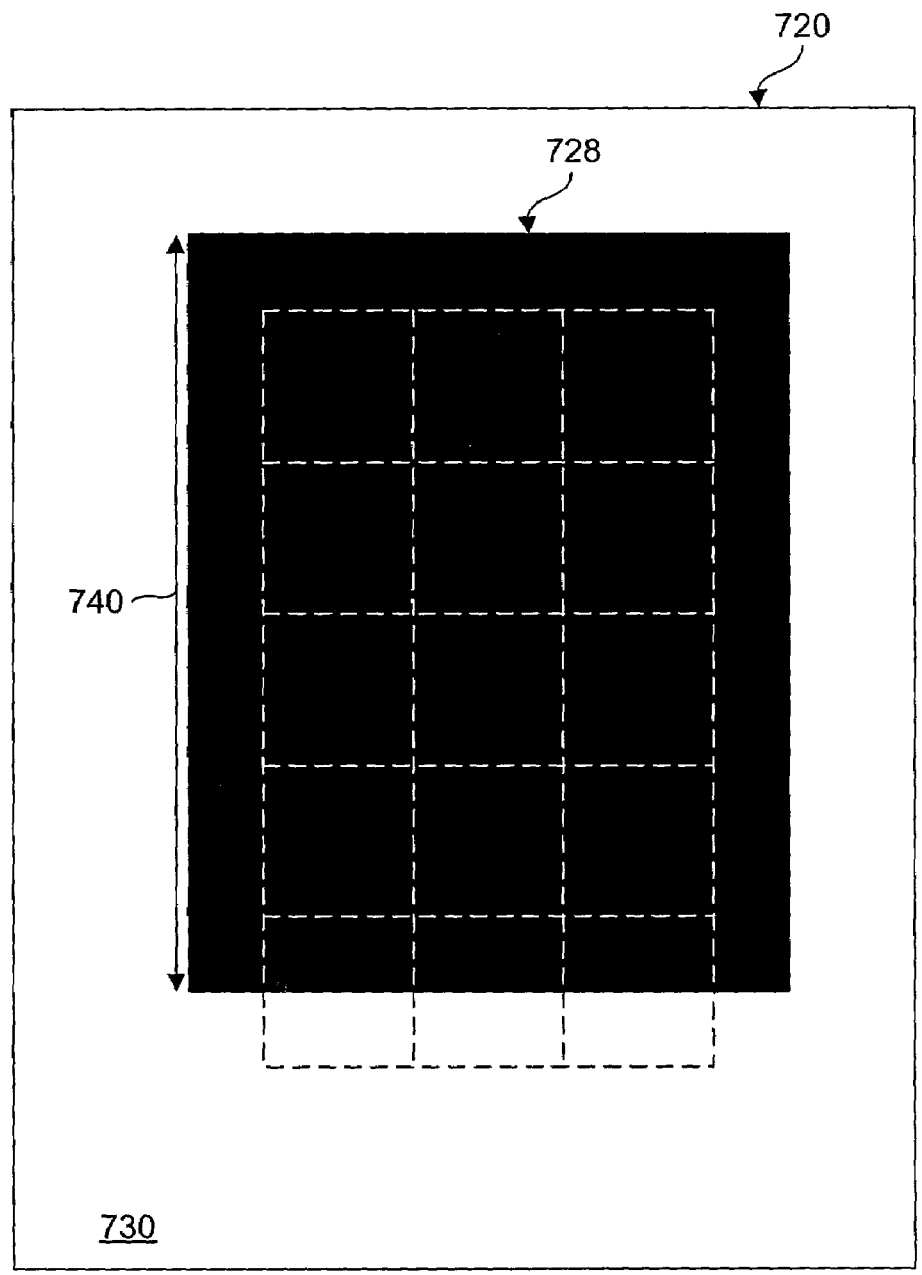
FIG. 7 is an illustration of an alternative embodiment of a printed graphical code.

FIG. 7 is an illustration of an alternative embodiment of a printed graphical code 720. The printed graphical code 720 shown in FIG. 7 corresponds to the size compensated graphical code image 624 shown in FIG. 6. That is, FIG. 7 illustrates how the size compensated graphical code image 624 in FIG. 6 would appear if it 624 were printed on a printing surface. Once again, for purposes of illustration, the dotted lines that illustrate the boundaries of the pixels 232 in the graphical code image 218 in FIG. 2 are superimposed on the printed graphical code 720.

Each pixel 232 in the size compensated graphical code 624 experiences a pixel gain of one during printing. The length 640 of the non-white region 628 in the size compensated graphical code image 624 is four length units. Thus, the length 740 of the non-white region 728 in the printed graphical code 720 is five length units. This matches the length 240 of the graphical code image 218 shown in FIG. 2. Thus, length compensation has eliminated the length distortion in the printed graphical code 720 due to ink bleeding.

Figure 8:
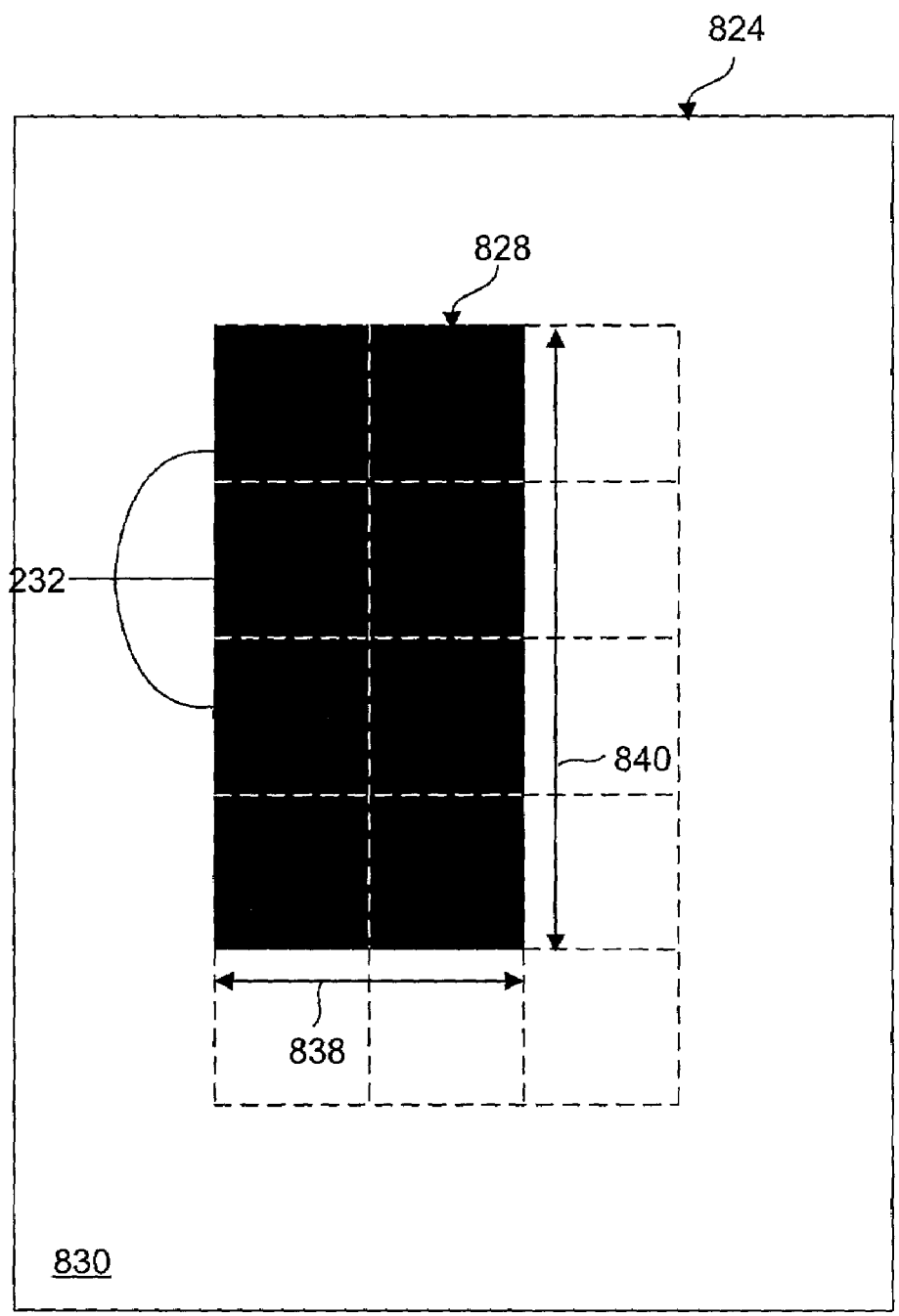
FIG. 8 is an illustration of an alternative embodiment of a size compensated graphical code image.

FIG. 8 is an illustration of an alternative embodiment of a size compensated graphical code image 824. The size compensated graphical code image 824 shown in FIG. 8 corresponds to the graphical code image 218 shown in FIG. 2. That is, size compensation has been performed on the graphical code image 218 shown in FIG. 2 in order to produce the size compensated graphical code image 824 shown in FIG. 8. Once again, for purposes of illustration, the dotted lines that illustrate the boundaries of the pixels 232 in the graphical code image 218 in FIG. 2 are superimposed on the size compensated graphical code image 824 in FIG. 8.

In the embodiment shown in FIG. 8, area compensation has been performed assuming a pixel gain of one. As stated previously, area compensation may involve reducing the area 241 of the non-white region 228 in the graphical code image 218 by an amount that will compensate for the increase in area 241 that occurs during printing. Where the non-white region 228 has a uniform width 238 and length 240, area compensation may involve reducing the width 238 of the non-white region 228 by pixel gain width units, and reducing the length 240 of the non-white region 228 by pixel gain length units. In the embodiment shown in FIG. 8, area compensation involves reducing the width 238 of the non-white region 228 by one width unit, and reducing the length 240 of the non-white region 228 by one length unit. Thus, the width 838 of the non-white region 828 in the size compensated graphical code image 824 is two width units, and the length 840 of the non-white region 828 is four length units.

In the embodiment shown in FIG. 8, the size compensated graphical code image 824 has been created by eliminating one row 242 and one column 244 of pixels 232 from the non-white region 228 in the graphical code image 218. Of course, as discussed previously, the width 238 and length 240 of the non-white region 228 may be reduced in many other ways as well.

Figure 9:
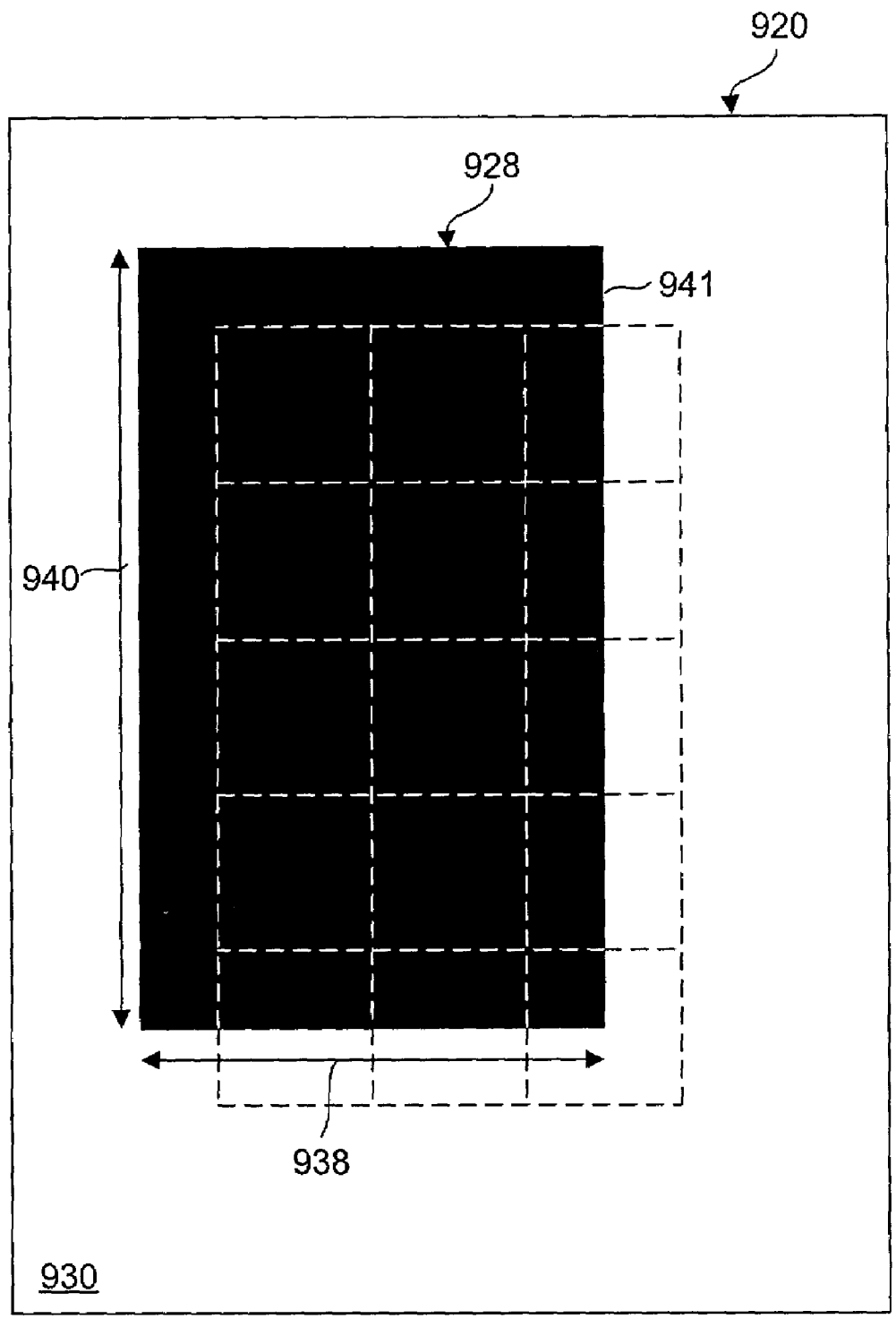
FIG. 9 is an illustration of an alternative embodiment of a printed graphical code.

FIG. 9 is an illustration of an alternative embodiment of a printed graphical code 920. The printed graphical code 920 shown in FIG. 9 corresponds to the size compensated graphical code image 824 shown in FIG. 8. That is, FIG. 9 illustrates how the size compensated graphical code image 824 in FIG. 8 would appear if it 824 were printed on a printing surface. Once again, for purposes of illustration, the dotted lines that illustrate the boundaries of the pixels 232 in the graphical code image 218 in FIG. 2 are superimposed on the printed graphical code 920.

Each pixel 232 in the size compensated graphical code 824 experiences a pixel gain of one during printing. The width 838 of the non-white region 828 in the size compensated graphical code image 824 is two width units, and the length 840 of the non-white region 828 in the size compensated graphical code image 824 is four length units. Thus, the width 938 of the non-white region 928 in the printed graphical code 920 is three width units, the length 940 of the non-white region 928 in the printed graphical code 920 is five length units, and the area 941 of the non-white region 928 in the printed graphical code 920 is fifteen area units. This matches the area 241 of the non-white region 228 in the graphical code image 218 shown in FIG. 2. Thus, area compensation has eliminated the area distortion in the printed graphical code 920 due to ink bleeding.

In the embodiments discussed previously, the pixel gain has been one. Of course, the pixel gain may be greater or less than one. Suppose the pixel gain were 0.5. This means that the width 238 of each pixel 232 increases by 0.5 width units during printing, and the length 240 of each pixel 232 increases by 0.5 length units during printing. If the graphical code image 218 shown in FIG. 2 experiences a pixel gain of 0.5 during printing, the non-white region 328 in the printed graphical code 320 would have a width 338 of 3.5 width units, a length 340 of 5.5 length units, and an area of 19.25 area units.

Figure 10:
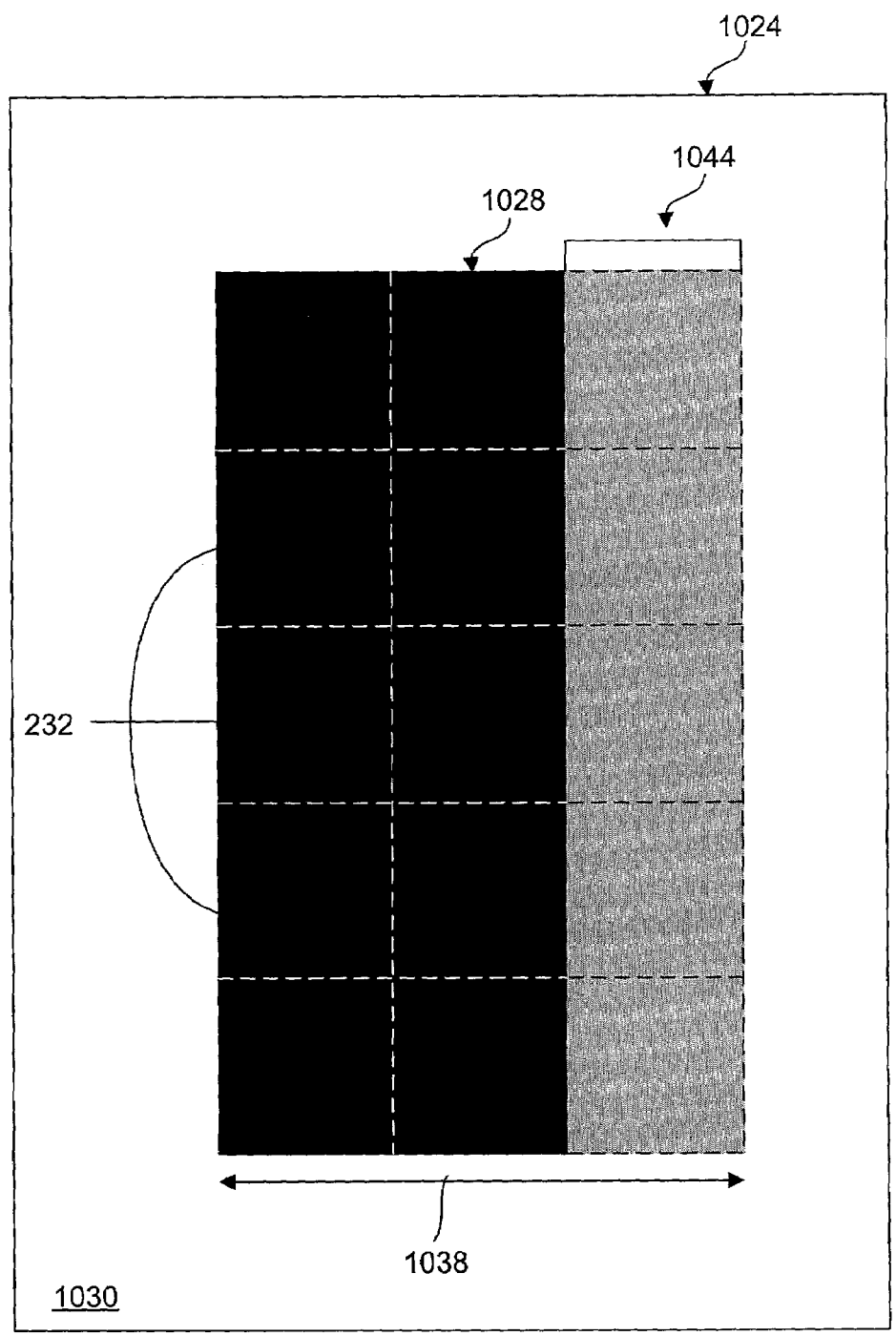
FIG. 10 is an illustration of an alternative embodiment of a size compensated graphical code image.

FIG. 10 is an illustration of an alternative embodiment of a size compensated graphical code image 1024. The size compensated graphical code image 1024 shown in FIG. 10 corresponds to the graphical code image 218 shown in FIG. 2. That is, size compensation has been performed on the graphical code image 218 shown in FIG. 2 in order to produce the size compensated graphical code image 1024 shown in FIG. 10. Once again, for purposes of illustration, the dotted lines that illustrate the boundaries of the pixels 232 in the graphical code image 218 of FIG. 2 are superimposed on the size compensated graphical code image 1024.

In the embodiment shown in FIG. 10, width compensation has been performed assuming a pixel gain of 0.5. As stated previously, width compensation may involve reducing the width 238 of the non-white region 228 in the graphical code image 218 by an amount that will compensate for the increase in width 238 that occurs during printing. Because the non-white region 228 in the graphical code image 218 has a uniform width 238, and because the pixel gain is 0.5, the non-white region 228 will increase by 0.5 width units during printing. Thus, the width 1038 of the non-white region 1028 in the size compensated graphical code image 1024 shown in FIG. 10 is 2.5 width units, which is 0.5 width units narrower than the width 238 of the non-white region 228 in the graphical code image 218.

As discussed previously, the width 238 of the non-white region 228 in the graphical code image 218 may be reduced in several ways. In the embodiment shown in FIG. 10, the pixels 232 in the third column 1044 have a width of 0.5 width units. Specifically, the color of the pixels 232 in the third column 1044 is 50% black. Consequently, the width 1038 of the non-white region 1028 in the size compensated graphical code image 1024 is 2.5 width units.

Those skilled in the art will recognize additional ways to reduce the width 238 of the non-white region 228 in light of the teachings contained herein. For example, as explained previously, multiple columns 244 of pixels 232 may be reduced in width 234.

Figure 11:
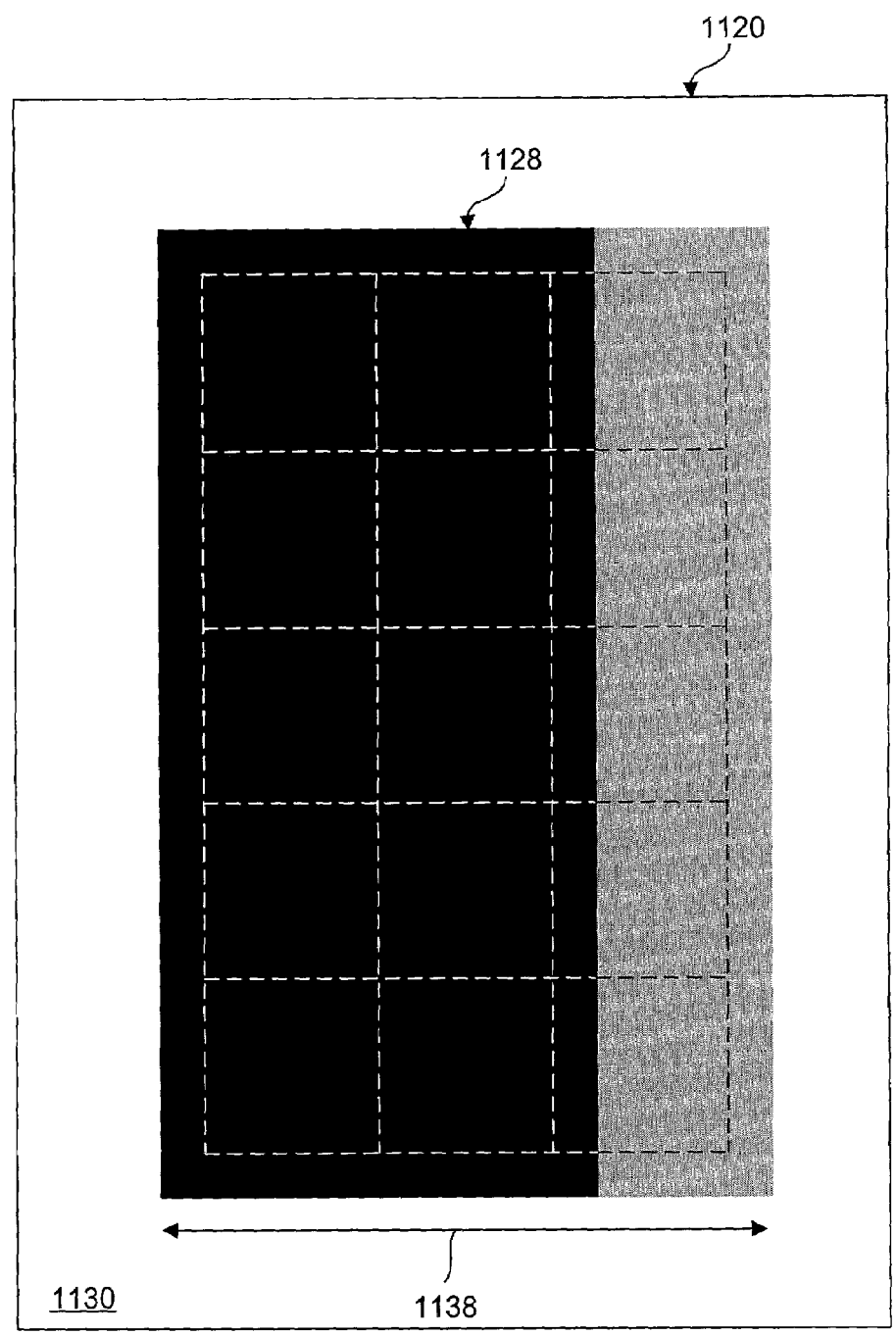
FIG. 11 is an illustration of an alternative embodiment of a printed graphical code.

FIG. 11 is an illustration of an alternative embodiment of a printed graphical code 1120. The printed graphical code 1120 shown in FIG. 11 corresponds to the size compensated graphical code image 1024 shown in FIG. 10. That is, FIG. 11 illustrates how the size compensated graphical code image 1024 in FIG. 10 would appear if it 1024 were printed on a printing surface. Once again, for purposes of illustration, the dotted lines that illustrate the boundaries of the pixels 232 in the graphical code image 218 in FIG. 2 are superimposed on the printed graphical code 1120.

Each pixel 232 in the size compensated graphical code 1024 experiences a pixel gain of 0.5 during printing. The width 1038 of the non-white region 1028 in the size compensated graphical code image 1024 is 2.5 width units. Thus, the width 1138 of the non-white region 1128 in the printed graphical code 1120 is three width units. This matches the width 238 of the graphical code image 218 shown in FIG. 2. Thus, width compensation has eliminated the width distortion in the printed graphical code 1120 due to ink bleeding.

In the embodiments described previously, the non-white regions 228 had a uniform width 238 and length 240. Of course, the methods and systems described herein may also be used to reduce the effects of ink bleeding on non-white regions 228 that do not have a uniform width 238 and/or length 240.

Figure 12:
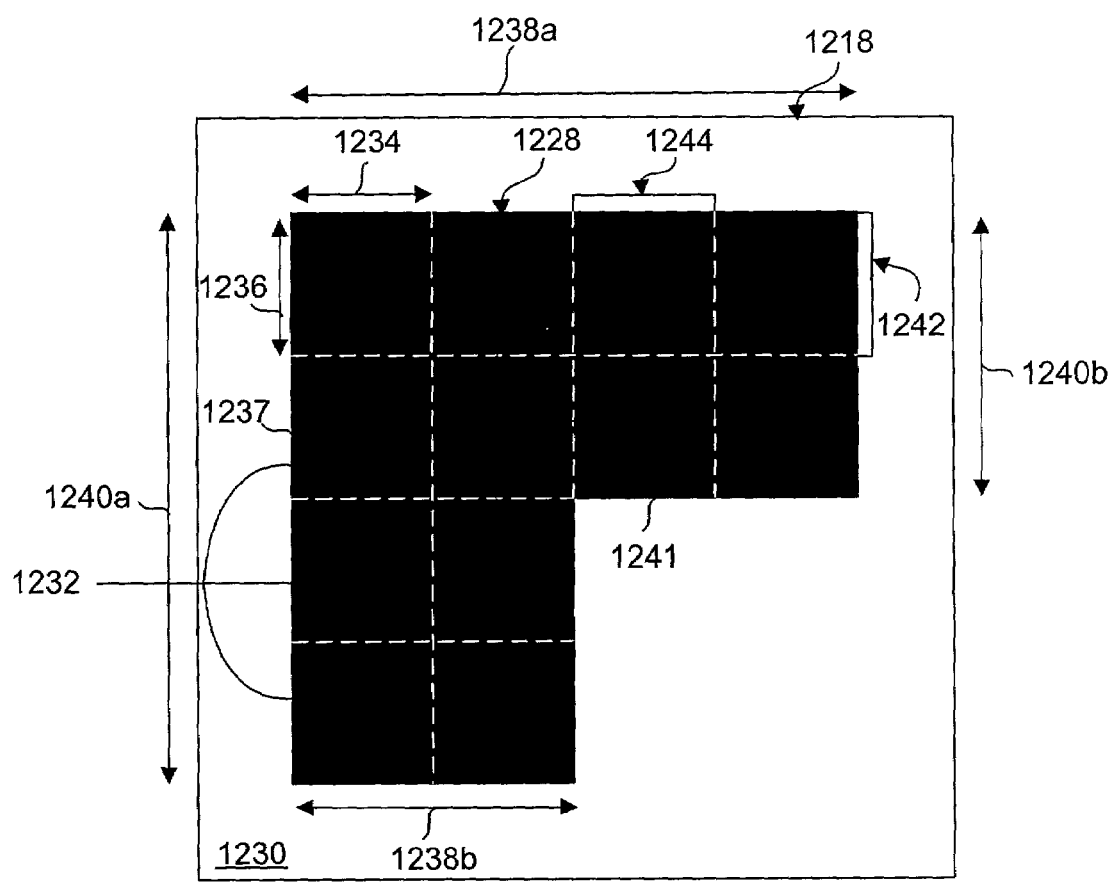
FIG. 12 is an illustration of an alternative embodiment of a graphical code image.

FIG. 12 is an illustration of an alternative embodiment of a graphical code image 1218. The graphical code image 1218 includes a non-white region 1228 surrounded by a white region 1230. As before, the non-white region 1228 includes a plurality of pixels 1232, the boundaries of which are illustrated by dotted lines.

Each pixel 1232 has a width 1234 of one width unit, a length 1236 of one length unit, and an area 1237 of one area unit. There are twelve pixels 1232 in the non-white region 1228 of FIG. 12. The area of the non-white region 1228 is twelve area units.

The non-white region 1228 does not have a uniform width 1238 or a uniform length 1240. The pixels 1232 in the non-white region 1228 are organized into rows 1242 and columns 1244. The first and second rows 1242 each have a width 1238a of four width units. The third and fourth rows 1242 each have a width 1238b of two width units. The first and second columns 1244 each have a length 1240a of four length units. The third and fourth columns 1244 each have a length 1240b of two length units.

Figure 13:
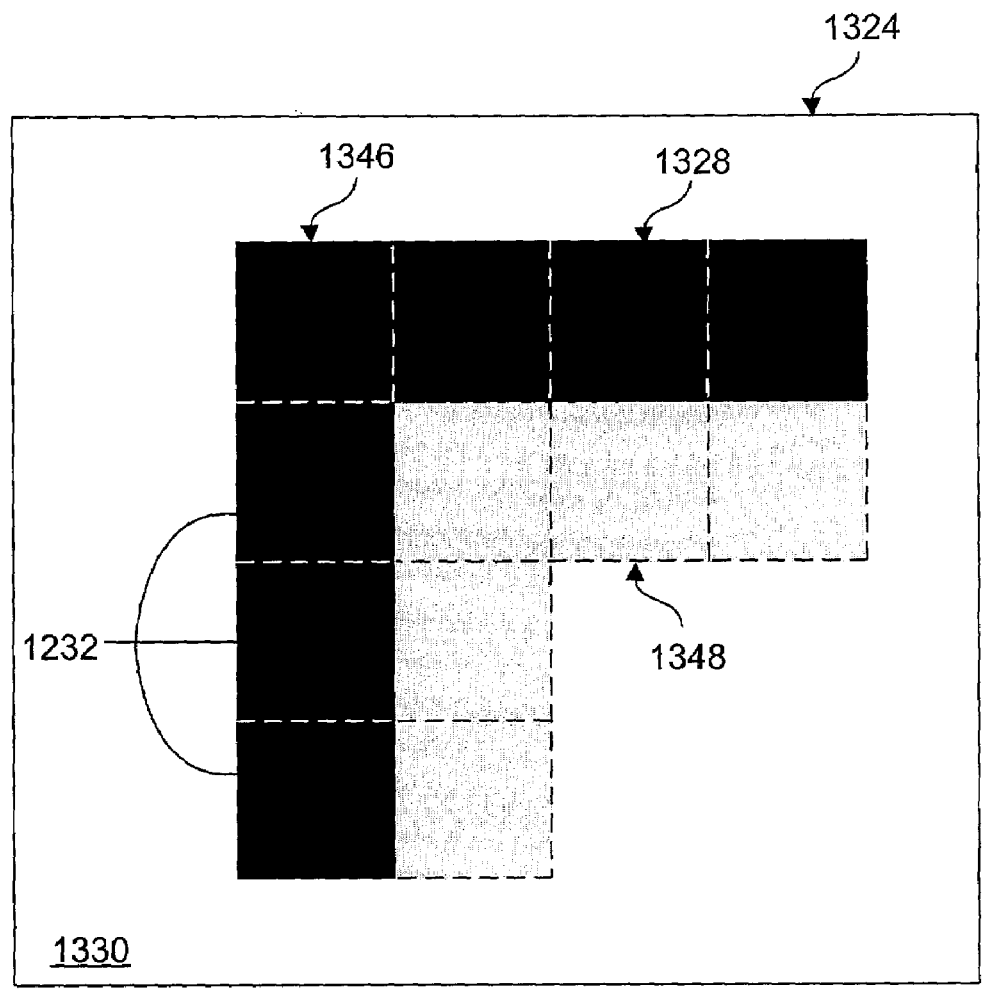
FIG. 13 is an illustration of an alternative embodiment of a size compensated graphical code image.

FIG. 13 is an illustration of an alternative embodiment of a size compensated graphical code image 1324. The size compensated graphical code image 1324 shown in FIG. 13 corresponds to the graphical code image 1218 shown in FIG. 12. That is, size compensation has been performed on the graphical code image 1218 shown in FIG. 12 in order to produce the size compensated graphical code image 1324 shown in FIG. 13. For purposes of illustration, the dotted lines that illustrate the boundaries of the pixels 1232 in the graphical code image 1218 of FIG. 12 are superimposed on the size compensated graphical code image 1324 shown in FIG. 13.

In the embodiment shown in FIG. 13, area compensation has been performed assuming a pixel gain of 0.5. As stated previously, area compensation may involve reducing the area 1241 of the non-white region 1228 in the graphical code image 1218 by an amount that will compensate for the increase in area 1241 that occurs during printing.

Where the non-white region 228 does not have a uniform width 1238 and/or length 1240, area compensation may be performed in many different ways. One specific algorithm that may be used to produce the size compensated graphical code image 1324 shown in FIG. 13 will be discussed in greater detail in connection with FIG. 18.

To produce the size compensated graphical code image 1324 shown in FIG. 13, the area 1237 of five of the pixels 1232 in the size compensated graphical code image 1324 has been changed from one area unit each to 0.15 area units each. This has been accomplished by changing the color of these five pixels 1232 from black to 15% black. Thus, the non-white region 1328 in the size compensated graphical code image 1324 includes a black region 1346 and a gray region 1348.

Figure 14:
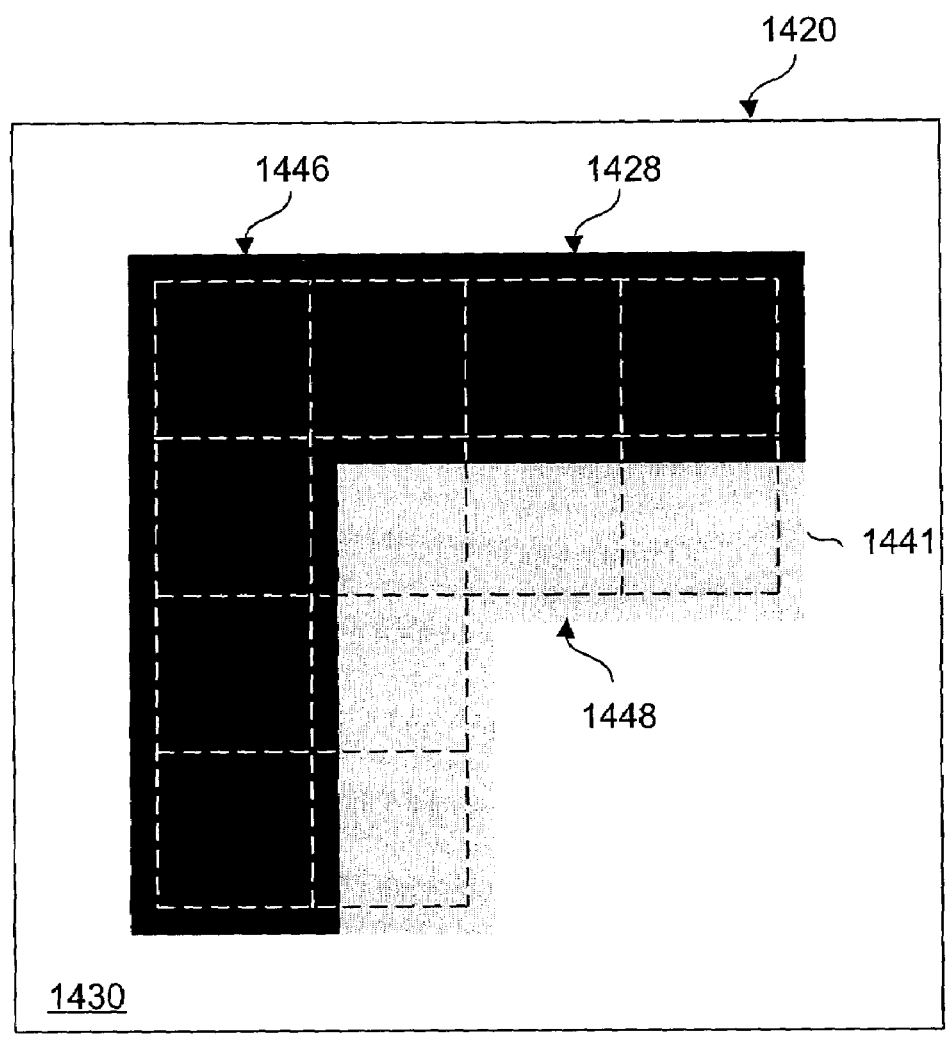
FIG. 14 is an illustration of an alternative embodiment of a printed graphical code.

FIG. 14 is an illustration of an alternative embodiment of a printed graphical code 1420. The printed graphical code 1420 shown in FIG. 14 corresponds to the size compensated graphical code image 1324 shown in FIG. 13. That is, FIG. 14 illustrates how the size compensated graphical code image 1324 in FIG. 13 would appear if it 1324 were printed on a printing surface. Once again, for purposes of illustration, the dotted lines that illustrate the boundaries of the pixels 1232 in the graphical code image 1218 in FIG. 12 are superimposed on the printed graphical code 1420.

Each pixel 1232 in the size compensated graphical code 1324 experiences a pixel gain of 0.5 during printing. Some of the pixel gain experienced by the pixels 1232 in the gray region 1448 is covered by the pixel gain of the pixels 1232 in the black region 1446. Thus, the area occupied by the black region 1446 is 11.25 area units, while the area occupied by the gray region 1448 is 0.75 area units (there are five gray pixels 1232 of one area unit apiece, and each gray pixel 1232 is colored 15% black). Consequently, the area 1441 of the non-white region 1428 in the printed graphical code 1420 is twelve area units. This matches the area 1241 of the non-white region 1228 in the graphical code image 1218 shown in FIG. 12. Thus, area compensation has eliminated the area distortion in the printed graphical code 1420 due to ink bleeding.

Figure 15:
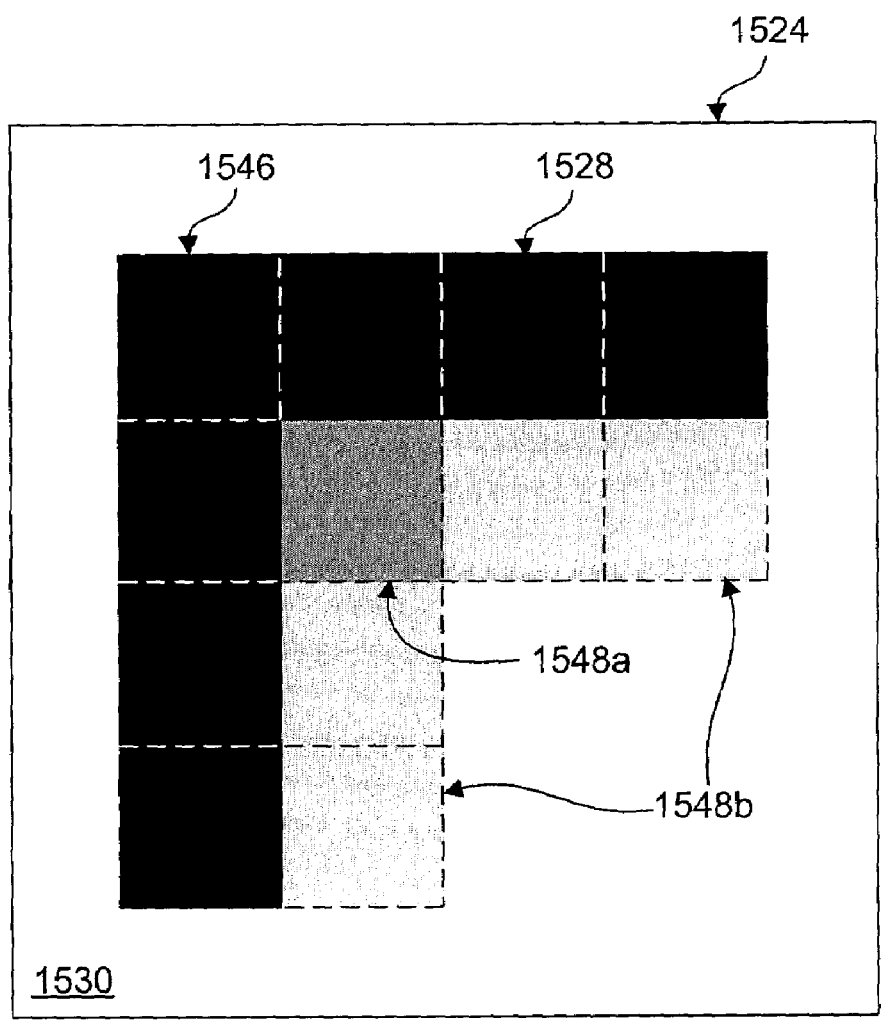
FIG. 15 is an illustration of an alternative embodiment of a size compensated graphical code image.

FIG. 15 is an illustration of an alternative embodiment of a size compensated graphical code image 1524. The size compensated graphical code image 1524 shown in FIG. 15 corresponds to the graphical code image 1218 shown in FIG. 12. That is, size compensation has been performed on the graphical code image 1218 shown in FIG. 12 in order to produce the size compensated graphical code image 1524 shown in FIG. 15. Once again, for purposes of illustration, the dotted lines that illustrate the boundaries of the pixels 1232 in the graphical code image 1218 of FIG. 12 are superimposed on the size compensated graphical code image 1524 shown in FIG. 15.

Once again, area compensation has been performed assuming a pixel gain of 0.5. The size compensated graphical code image 1524 shown in FIG. 15 includes a dark gray region 1548a and two light gray regions 1548b. The area 1237 of the pixel 1232 in the dark gray region 1548a is 0.31 area units. The color of the pixel 1232 in the dark gray region 1548a is 31% black. The area 1237 of each pixel 1232 in the light gray regions 1548b is 0.11 area units. The color of each pixel 1232 in the light gray regions 1548b is 11% black.

Figure 16:
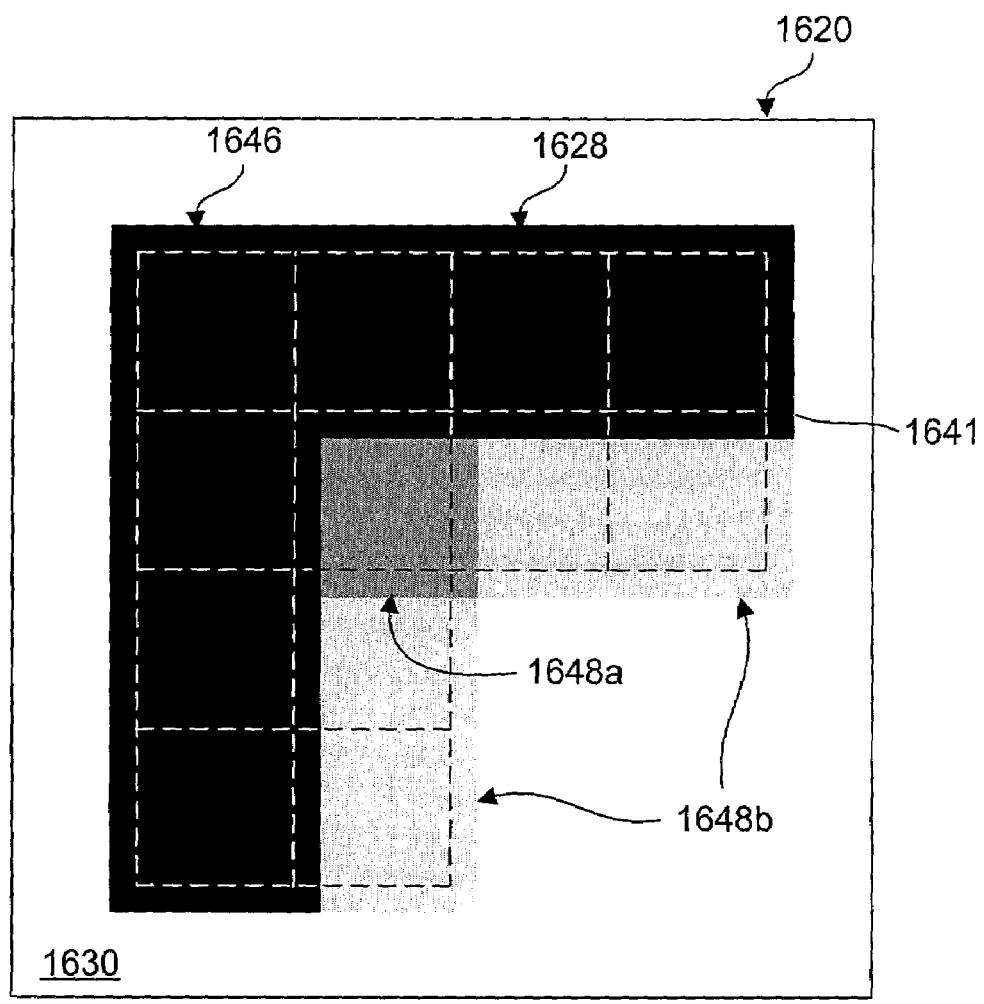
FIG. 16 is an illustration of an alternative embodiment of a printed graphical code.

FIG. 16 is an illustration of an alternative embodiment of a printed graphical code 1620. The printed graphical code 1620 shown in FIG. 16 corresponds to the size compensated graphical code image 1524 shown in FIG. 15. That is, FIG. 16 illustrates how the size compensated graphical code image 1524 in FIG. 15 would appear if it 1524 were printed on a printing surface. Once again, for purposes of illustration, the dotted lines that illustrate the boundaries of the pixels 1232 in the graphical code image 1218 in FIG. 12 are superimposed on the printed graphical code 1620.

Each pixel 1232 in the size compensated graphical code 1524 experiences a pixel gain of 0.5 during printing. Once again, some of the pixel gain experienced by the pixels 1232 in the dark gray region 1648a and the light gray regions 1648b is covered by the pixel gain of the pixels 1232 in the black region 1646. Thus, the area occupied by the black region 1646 is 11.25 area units. The area occupied by the dark gray region 1648a is 0.31 area units, and the area occupied by the light gray regions 1648b is 0.44 area units. Consequently, the area 1641 of the non-white region 1628 in the printed graphical code 1620 is twelve area units. This matches the area 1241 of the non-white region 1228 in the graphical code image 1218 shown in FIG. 12. Thus, area compensation has eliminated the area distortion in the printed graphical code 1620 due to ink bleeding.

Figure 17:
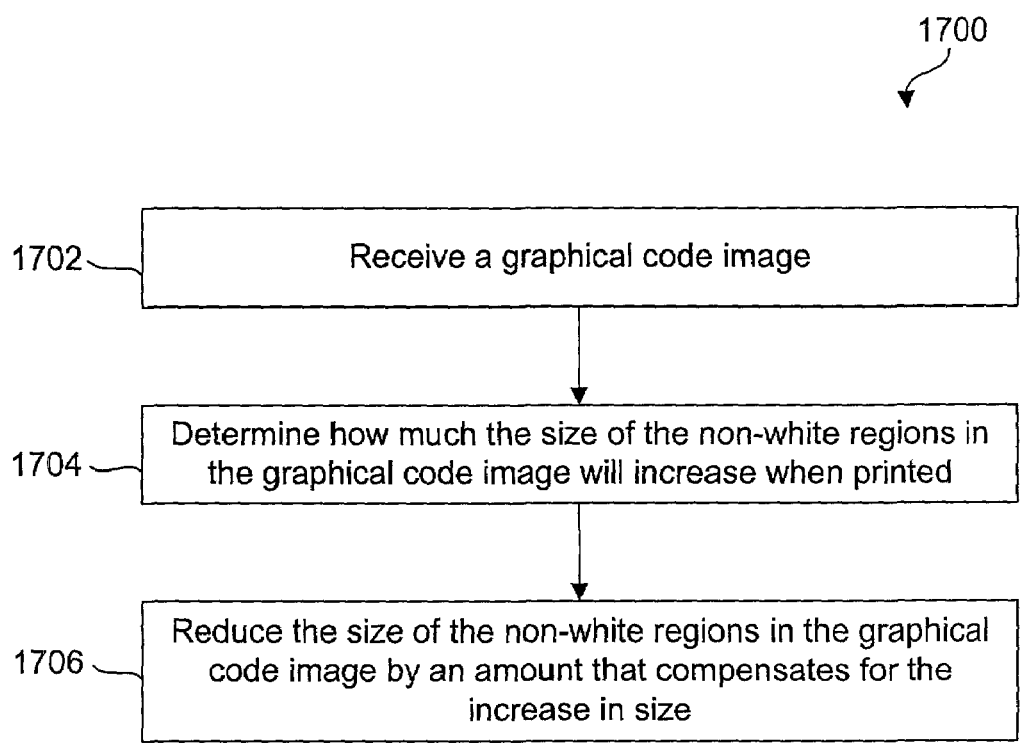
FIG. 17 is a flow diagram illustrating a method for increasing the readability of a machine-readable graphical code on a printing surface.

FIG. 17 is a flow diagram illustrating a method 1700 for increasing the readability of a machine-readable graphical code on a printing surface. The method 1700 begins when a graphical code image 118 is received 1702. The method 1700 may then involve determining 1704 how much the size of the non-white regions 228 in the graphical code image 118 will increase when printed. This may involve determining 1704 how much the width 238, length 240, area 241, or other desired size of the non-white regions 228 in the graphical code image 118 will increase when printed. The method 1700 may then involve reducing 1706 the size (e.g., width 238, length 240, area 241, etc.) of the non-white regions 228 in the graphical code image 118 by an amount that compensates for the increase in size that will occur during printing.

Figure 18:
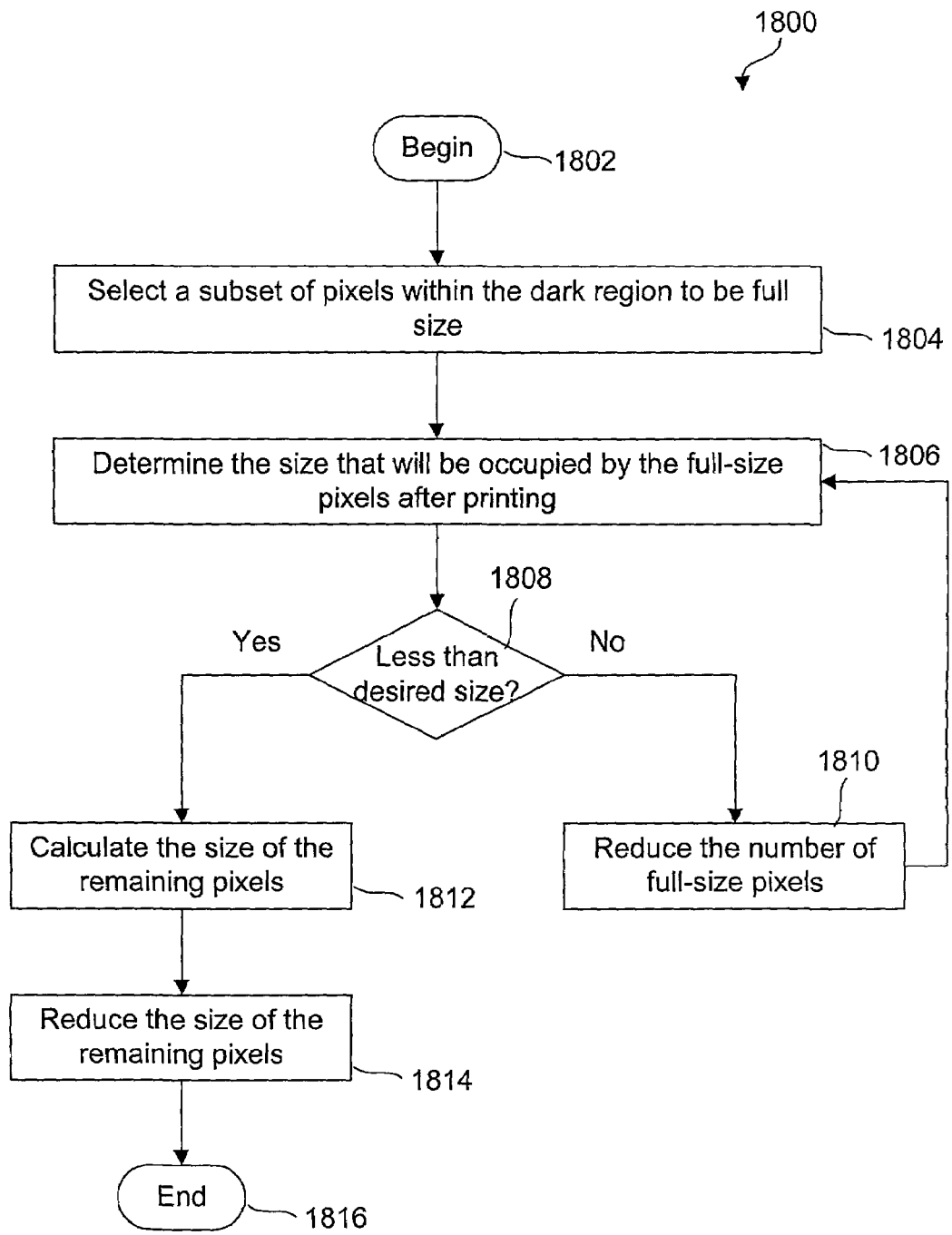
FIG. 18 is a flow diagram illustrating a method for reducing the size of the non-white regions in the graphical code image by an amount that compensates for the increase in size that will occur during printing.

FIG. 18 is a flow diagram illustrating a method 1800 for reducing the size of the non-white regions 228 in the graphical code image 218 by an amount that compensates for the increase in size that will occur during printing. The method 1800 begins 1802 by selecting 1804 a subset of pixels 232 within the non-white region 228 that will be full size. If the size is a width 238, the subset of full-size pixels 232 is preferably a complete column 244 of pixels 232. If the size is a length 240, the subset of full-size pixels 232 is preferably a complete row 242.

The method 1800 may then involve determining 1806 the size that will be occupied by the full-size pixels 232 after printing. If it is determined 1808 that the full-size pixels 232 will occupy a greater area than the desired size of the printed graphical code 120, the number of full-size pixels 232 may be reduced 1810, and the method 1800 may return to step 1806 and proceed as described above.

If it is determined 1808 that the full-size pixels 232 will not occupy a greater area than the desired size of the printed graphical code 120, the size of the remaining pixels 232 may be calculated 1812. The size of the remaining pixels 232 may then be reduced 1814 by the amount calculated in step 1812. The method 1800 may then end 1816.

For example, with reference to the embodiment described previously in FIGS. 12–14, seven pixels 1232 within the non-white region 1228 were selected 1804 to be full size. The selection 1804 of seven pixels 1232 was arbitrary; any subset of the pixels 1232 within the graphical code image 1218 may be selected 1804. It was then determined 1806 that these seven pixels 1232 would occupy an area of 11.25 area units after printing. The desired area 1241 of the graphical code image 1218 is twelve area units, so it was determined 1806, 1808 that the seven pixels 1232 would themselves occupy an area that is less than the desired area 1241 of the graphical code image 1218. The area of the remaining pixels 1232 was then calculated 1812. This was accomplished by recognizing that the remaining five pixels 1232 could occupy a total area of 0.75 area units, or 0.15 area units apiece. The size of the remaining five pixels 1232 was then reduced 1814 to 0.15 area units apiece. This was accomplished by changing the color of these five pixels 1232 from black to 15% black.

In the embodiment described in FIG. 15, the step of calculating 1812 the area of the remaining pixels 1232 differs from that described immediately above. In particular, the 0.75 area units that may be occupied by the remaining five pixels 1232 is not evenly distributed. In FIG. 15, the area 1237 of the pixel 1232 in the dark gray region 1548*a* is 0.31 area units, and the area 1237 of each pixel 1232 in the light gray regions 1548*b* is 0.11 area units. Of course, the specific area 1237 values given above are exemplary only. Those skilled in the art will recognize numerous alternative ways to calculate 1812 the area of the remaining pixels 1232 in light of the teachings contained herein.

Figure 19:
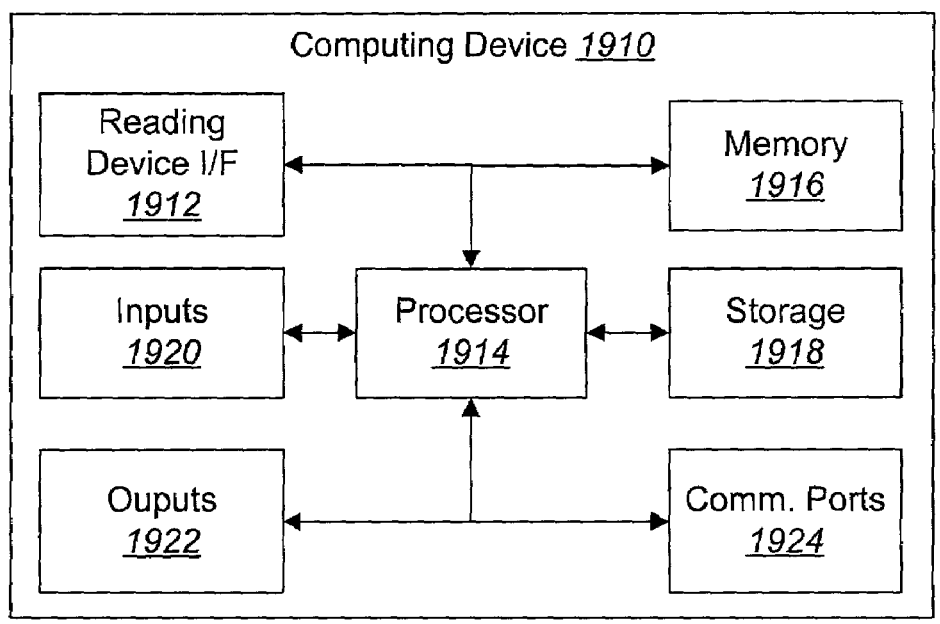
FIG. 19 is a block diagram of hardware components that may be used in an embodiment of a computing device.

FIG. 19 is a block diagram of hardware components that may be used in an embodiment of a computing device 1910. The computing device 1910 may include a reading device interface 1912 to facilitate communication with a graphical code reading device. The reading device interface 1912 may be a standard communications port typically found on a computing device 1910, or it may be a specialized interface card provided along with the graphical code reading device.

Many different types of computer systems may be used to implement the computing device 1910 illustrated herein. The diagram of FIG. 19 illustrates typical components of a computing device 1910 including a processor 1914, memory 1916, a storage device 1918, an input device 1920, and an output device 1922.

One or more communication ports 1924 may also be included in the computing device 1910. It will be appreciated by those skilled in the art that more components may be included in the computing device 1910. For example, several input devices 1920 may be included, such as a keyboard, a mouse, a joystick, a touch screen, etc. In addition, several output devices 1922 may be included such as a monitor, speakers, a printer, etc. Thus, those skilled in the art will appreciate that additional components may be added to the computing device 1910 without detracting from the functionality to serve as a computing device.

The computing device 1910 may be a conventional desktop computer. Desktop computers are commercially available. However, it will be appreciated by those skilled in the art that the computing device 1910 is a broadly defined digital computer. A computing device 1910, as used herein, is any device that includes a digital processor capable of receiving and processing data. A computing device 1910 includes the broad range of digital computers including microcontrollers, hand-held computers, personal computers, servers, mainframes, supercomputers, and any variation or related device thereof.

While the terms "printing," "white" and "non-white" have been used in this description, it should be understood that other processes besides printing can be used to mark a surface with a graphical code, and some processes mark the light portion rather than the dark portion; and it may be the light portion rather than the dark portion that increases in size during the marking process. The present invention is not limited to printing; the same steps may be applied to other marking processes. Nor is the present invention limited to reducing the size of the dark portion; the same steps may be applied to reduce the size of the light portion instead.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for increasing the readability of a machine-readable graphical code on a surface, comprising:
   receiving a graphical code image, the graphical code image being an electronic representation of a graphical code, the graphical code image comprising:
      a first region having a first color; and
      a second region adjacent to the first region, the second region having a second color and a size;
   determining a size increase of the second region, the size increase indicating how much the size of the second region will increase when the graphical code image is marked on the surface; and
   creating a size compensated graphical code image by altering the representation of the second region within the graphical code image in order to substantially compensate for the size increase of the second region, wherein altering the representation of the second region comprises reducing the length of the second region and eliminating a first pixel of a plurality of pixels.

2. The method of claim 1, wherein the size comprises a width, and wherein altering the representation of the second region comprises reducing the width of the second region.

3. The method of claim 1, wherein the size comprises an area, and wherein altering the representation of the second region comprises reducing the area of the second region.

4. The method of claim 1, wherein the second region comprises a first pixel, the first pixel having a pixel size, and wherein altering the representation of the second region comprises reducing the pixel size of the first pixel.

5. The method of claim 4, wherein reducing the pixel size of the first pixel comprises changing the first pixel from a first pixel color to a second pixel color.

6. The method of claim 5, wherein the first pixel color has a first darkness, wherein the second pixel color has a second darkness, and wherein the difference between the first darkness and the second darkness is proportional to the reduction in the pixel size of the first pixel.

7. A computing device for increasing the readability of a machine-readable graphical code on a surface, comprising:
   a processor;
   memory in electronic communication with the processor;
   a graphical code generator configured to convert source data into a graphical code image, the graphical code image being an electronic representation of a graphical code, the graphical code image comprising a first region and a second region adjacent to the first region, the first region having a first color, and the second region having a second color and a size; and
   a compensation module in electronic communication with the graphical code generator, the compensation module being configured to:
      receive the graphical code image from the graphical code generator;
      determine a size increase of the second region, the size increase indicating how much the size of the second region will increase when the graphical code image is marked on the surface; and create a size compensated graphical code image by altering the representation of the second region within the graphical code image in order to substantially compensate for the size increase of the second region wherein altering the representation of the second region comprises reducing the length of the second region and eliminating a first pixel of a plurality of pixels.

8. The computing device of claim 7, wherein the size comprises a width, and wherein altering the representation of the second region comprises reducing the width of the second region.

9. The computing device of claim 7, wherein the size comprises an area, and wherein altering the representation of the second region comprises reducing the area of the second region.

10. The computing device of claim 7, wherein the second region comprises a first pixel, the first pixel having a pixel size, and wherein altering the representation of the second region comprises reducing the pixel size of the first pixel.

11. The computing device of claim 10, wherein reducing the pixel size of the first pixel comprises changing the first pixel from a first pixel color to a second pixel color.

12. The computing device of claim 11, wherein the first pixel color has a first darkness, wherein the second pixel color has a second darkness, and wherein the difference between the first darkness and the second darkness is proportional to the reduction in the pixel size of the first pixel.

13. A computer-readable medium for storing program data, wherein the program data comprises executable instructions for implementing a method comprising:
receiving a graphical code image, the graphical code image being an electronic representation of a graphical code, the graphical code image comprising:
a first region having a first color; and
a second region adjacent to the first region, the second region having a second color and a size;
determining a size increase of the second region, the size increase indicating how much the size of the second region will increase when the graphical code image is marked on the surface; and
creating a size compensated graphical code image by altering the representation of the second region within the graphical code image in order to substantially compensate for the size increase of the second region, wherein altering the representation of the second region comprises reducing the length of the second region and eliminating a first pixel of a plurality of pixels.

14. The medium of claim 13, wherein the size comprises a width, and wherein altering the representation of the second region comprises reducing the width of the second region.

15. The medium of claim 13, wherein the size comprises an area, and wherein altering the representation of the second region comprises reducing the area of the second region.

16. The medium of claim 13, wherein the second region comprises a first pixel, the first pixel having a pixel size, and wherein altering the representation of the second region comprises reducing the pixel size of the first pixel.

17. The medium of claim 16, wherein reducing the pixel size of the first pixel comprises changing the first pixel from a first pixel color to a second pixel color.

18. The medium of claim 17, wherein the first pixel color has a first darkness, wherein the second pixel color has a second darkness, and wherein the difference between the first darkness and the second darkness is proportional to the reduction in the pixel size of the first pixel.

* * * * *